(12) United States Patent
Villaverde Corrales et al.

(10) Patent No.: US 12,540,172 B2
(45) Date of Patent: *Feb. 3, 2026

(54) THERAPEUTIC NANOCONJUGATES COMPRISING STEFIN A AND USES THEREOF

(71) Applicants: UNIVERSITAT AUTONOMA DE BARCELONA (UAB), Bellaterra (ES); FUNDACIÓ INSTITUT DE RECERCA DE L'HOSPITAL DE LA SANTA CREU I SANT PAU, Barcelona (ES); CONSORCIO CENTRO DE INVESTIGACIÓN BIOMÉDICA EN RED, M.P., Madrid (ES)

(72) Inventors: Antonio Villaverde Corrales, Bellaterra (ES); Esther Vázquez Gómez, Bellaterra (ES); Ugutz Unzueta Elorza, Barcelona (ES); Ramón Mangues Bafalluy, Barcelona (ES); María Virtudes Céspedes Navarro, Barcelona (ES); Isolda Casanova Rigat, Madrid (ES); Hector López Laguna, Bellaterra (ES)

(73) Assignees: UNIVERSITAT AUTONOMA DE BARCELONA (UAB), Bellaterra (ES); FUNDACIÓ INSTITUT DE RECERCA DE L'HOSPITAL DE LA SANTA CREU I SANT PAU, Barcelona (ES); CONSORCIO CENTRO DE INVESTIGACIÓN BIOMÉDICA EN RED, M.P., Madrid (ES)

( * ) Notice: Subject to any disclaimer, the term of this patent is extended or adjusted under 35 U.S.C. 154(b) by 1214 days.

This patent is subject to a terminal disclaimer.

(21) Appl. No.: 17/423,549

(22) PCT Filed: Jan. 16, 2020

(86) PCT No.: PCT/EP2020/051048
§ 371 (c)(1),
(2) Date: Jul. 16, 2021

(87) PCT Pub. No.: WO2020/148398
PCT Pub. Date: Jul. 23, 2020

(65) Prior Publication Data
US 2022/0072084 A1 Mar. 10, 2022

(30) Foreign Application Priority Data
Jan. 17, 2019 (EP) .................................... 19382031

(51) Int. Cl.
C07K 7/08 (2006.01)
A61K 38/10 (2006.01)
A61K 38/16 (2006.01)
A61K 38/19 (2006.01)
A61K 38/57 (2006.01)
A61P 35/00 (2006.01)
C07K 14/03 (2006.01)
C07K 14/52 (2006.01)
C07K 14/81 (2006.01)
A61K 47/64 (2017.01)

(52) U.S. Cl.
CPC .......... *C07K 14/8139* (2013.01); *A61K 38/10* (2013.01); *A61K 38/162* (2013.01); *A61K 38/195* (2013.01); *A61K 38/57* (2013.01); *C07K 7/08* (2013.01); *C07K 14/03* (2013.01); *C07K 14/522* (2013.01); *A61K 47/6455* (2017.08); *A61P 35/00* (2018.01); *C07K 2319/74* (2013.01)

(58) Field of Classification Search
CPC ... C07K 14/8139; C07K 7/08; C07K 2139/74
See application file for complete search history.

(56) References Cited

U.S. PATENT DOCUMENTS

| 12,202,866 | B2 * | 1/2025 | Villaverde Corrales .................... C07K 14/4702 |
| 2017/0080088 | A1 | 3/2017 | Savariar |
| 2017/0101474 | A1 * | 4/2017 | Li ........................... G01N 33/74 |
| 2017/0326252 | A1 | 11/2017 | Shuen |

FOREIGN PATENT DOCUMENTS

EP 3427756 A1 * 1/2019 ........... A61K 49/146

OTHER PUBLICATIONS

Tokuriki et al, 2009, Current Opinion in Structural Biology. 19: 596-604.*
Bhattacharya et al, 2017. Plos One. 12(3): e0171355, pp. 1-22 as printed.*
Liang et al, 2008. Chem Biol Drug Design. 72: 97-110.*
Zhao et al, 2014. Oncotarget. 6(7): 5022-5040.*
R. Woodman, et al., Design and validation of a neutral protein scaffold for the presentation of peptide aptamers, J. Mol. Biol., 2005, 352, 1118-33.
International Search Report dated Jun. 23, 2020 for PCT/EP2020/051048.

* cited by examiner

*Primary Examiner* — Zachary C Howard
(74) *Attorney, Agent, or Firm* — Casimir Jones, S.C.; Tristan A. Fuierer

(57) ABSTRACT

The present invention relates to nanostructured conjugates, more specifically to nanostructured fusion proteins suitable for the selective delivery of their conjugated therapeutic agents to specific cell and tissue types. It also relates to nanoparticles comprising such nanostructured proteins and the therapeutic uses thereof.

13 Claims, 6 Drawing Sheets
Specification includes a Sequence Listing.

SEQUENCE LISTING

```
<160> NUMBER OF SEQ ID NOS: 36

<210> SEQ ID NO 1
<211> LENGTH: 9
<212> TYPE: PRT
<213> ORGANISM: Artificial Sequence
<220> FEATURE:
<223> OTHER INFORMATION: Polycationic peptide

<400> SEQUENCE: 1

Arg Arg Arg Arg Arg Arg Arg Arg Arg
1               5

<210> SEQ ID NO 2
<211> LENGTH: 9
<212> TYPE: PRT
<213> ORGANISM: Artificial Sequence
<220> FEATURE:
<223> OTHER INFORMATION: Polycationic peptide

<400> SEQUENCE: 2

Arg Arg Arg Gly Arg Gly Arg Arg Arg
1               5

<210> SEQ ID NO 3
<211> LENGTH: 9
<212> TYPE: PRT
<213> ORGANISM: Artificial Sequence
<220> FEATURE:
<223> OTHER INFORMATION: Polycationic peptide

<400> SEQUENCE: 3

Arg Ala Arg Gly Arg Gly Arg Arg Arg
1               5

<210> SEQ ID NO 4
<211> LENGTH: 9
<212> TYPE: PRT
<213> ORGANISM: Artificial Sequence
<220> FEATURE:
<223> OTHER INFORMATION: Polycationic peptide

<400> SEQUENCE: 4
```

Arg Ala Arg Gly Arg Gly Gly Gly Ala
1               5

<210> SEQ ID NO 5
<211> LENGTH: 18
<212> TYPE: PRT
<213> ORGANISM: Artificial Sequence
<220> FEATURE:
<223> OTHER INFORMATION: T22 peptide

<400> SEQUENCE: 5

Arg Arg Trp Cys Tyr Arg Lys Cys Tyr Lys Gly Tyr Cys Tyr Arg Lys
1               5                   10                  15

Cys Arg

<210> SEQ ID NO 6
<211> LENGTH: 21
<212> TYPE: PRT
<213> ORGANISM: Artificial Sequence
<220> FEATURE:
<223> OTHER INFORMATION: V1 peptide

<400> SEQUENCE: 6

Leu Gly Ala Ser Trp His Arg Pro Asp Lys Cys Cys Leu Gly Tyr Gln
1               5                   10                  15

Lys Arg Pro Leu Pro
            20

<210> SEQ ID NO 7
<211> LENGTH: 67
<212> TYPE: PRT
<213> ORGANISM: Artificial Sequence
<220> FEATURE:
<223> OTHER INFORMATION: CXCL12 peptide

<400> SEQUENCE: 7

Lys Pro Val Ser Leu Ser Tyr Arg Cys Pro Cys Arg Phe Phe Glu Ser
1               5                   10                  15

His Val Ala Arg Ala Asn Val Lys His Leu Lys Ile Leu Asn Thr Pro
                20                  25                  30

Asn Cys Ala Leu Gln Ile Val Ala Arg Leu Lys Asn Asn Asn Arg Gln
            35                  40                  45

Val Cys Ile Asp Pro Lys Leu Lys Trp Ile Gln Glu Tyr Leu Glu Lys
        50                  55                  60

Ala Leu Asn
65

<210> SEQ ID NO 8
<211> LENGTH: 68
<212> TYPE: PRT
<213> ORGANISM: Artificial Sequence
<220> FEATURE:
<223> OTHER INFORMATION: vCCL2 peptide

<400> SEQUENCE: 8

Leu Gly Ala Ser Trp His Arg Pro Asp Lys Cys Cys Leu Gly Tyr Gln
1               5                   10                  15

Lys Arg Pro Leu Pro Gln Val Leu Leu Ser Ser Trp Tyr Pro Thr Ser
            20                  25                  30

Gln Leu Cys Ser Lys Pro Gly Val Ile Phe Leu Thr Lys Arg Gly Arg
        35                  40                  45

Gln Val Cys Ala Asp Lys Asp Trp Val Lys Lys Leu Met Gln Gln Leu

-continued

```
                50                  55                  60

Pro Val Thr Ala
 65

<210> SEQ ID NO 9
<211> LENGTH: 14
<212> TYPE: PRT
<213> ORGANISM: Artificial Sequence
<220> FEATURE:
<223> OTHER INFORMATION: T140 peptide
<220> FEATURE:
<221> NAME/KEY: MISC_FEATURE
<222> LOCATION: (3)..(3)
<223> OTHER INFORMATION: Xaa is L-3-(2-naphthyl)alanine
<220> FEATURE:
<221> NAME/KEY: MISC_FEATURE
<222> LOCATION: (8)..(8)
<223> OTHER INFORMATION: Xaa is D-Lys
<220> FEATURE:
<221> NAME/KEY: MISC_FEATURE
<222> LOCATION: (12)..(12)
<223> OTHER INFORMATION: Xaa is L-Citrulline

<400> SEQUENCE: 9

Arg Arg Xaa Cys Tyr Arg Lys Xaa Pro Tyr Arg Xaa Cys Arg
  1               5                  10

<210> SEQ ID NO 10
<211> LENGTH: 14
<212> TYPE: PRT
<213> ORGANISM: Artificial Sequence
<220> FEATURE:
<223> OTHER INFORMATION: TN14003 peptide
<220> FEATURE:
<221> NAME/KEY: MISC_FEATURE
<222> LOCATION: (3)..(3)
<223> OTHER INFORMATION: Xaa is L-3-(2-naphthyl)alanine
<220> FEATURE:
<221> NAME/KEY: MISC_FEATURE
<222> LOCATION: (6)..(6)
<223> OTHER INFORMATION: Xaa is L-Citrulline
<220> FEATURE:
<221> NAME/KEY: MISC_FEATURE
<222> LOCATION: (8)..(8)
<223> OTHER INFORMATION: Xaa is D-Lys
<220> FEATURE:
<221> NAME/KEY: MISC_FEATURE
<222> LOCATION: (12)..(12)
<223> OTHER INFORMATION: Xaa is L-Citrulline

<400> SEQUENCE: 10

Arg Arg Xaa Cys Tyr Xaa Lys Xaa Pro Tyr Arg Xaa Cys Arg
  1               5                  10

<210> SEQ ID NO 11
<211> LENGTH: 14
<212> TYPE: PRT
<213> ORGANISM: Artificial Sequence
<220> FEATURE:
<223> OTHER INFORMATION: TC 14012 peptide
<220> FEATURE:
<221> NAME/KEY: MISC_FEATURE
<222> LOCATION: (3)..(3)
<223> OTHER INFORMATION: Xaa is L-3-(2-naphthyl)alanine
<220> FEATURE:
<221> NAME/KEY: MISC_FEATURE
<222> LOCATION: (8)..(8)
<223> OTHER INFORMATION: Xaa is D-Citrulline
<220> FEATURE:
<221> NAME/KEY: MISC_FEATURE
<222> LOCATION: (12)..(12)
<223> OTHER INFORMATION: Xaa is L-Citrulline
```

```
<400> SEQUENCE: 11

Arg Arg Xaa Cys Tyr Glu Lys Xaa Pro Tyr Arg Xaa Cys Arg
1               5                   10

<210> SEQ ID NO 12
<211> LENGTH: 14
<212> TYPE: PRT
<213> ORGANISM: Artificial Sequence
<220> FEATURE:
<223> OTHER INFORMATION: TE14011 peptide
<220> FEATURE:
<221> NAME/KEY: MISC_FEATURE
<222> LOCATION: (3)..(3)
<223> OTHER INFORMATION: Xaa  is L-3-(2-naphthyl)alanine
<220> FEATURE:
<221> NAME/KEY: MISC_FEATURE
<222> LOCATION: (6)..(6)
<223> OTHER INFORMATION: Xaa is  L-Citrulline
<220> FEATURE:
<221> NAME/KEY: MISC_FEATURE
<222> LOCATION: (8)..(8)
<223> OTHER INFORMATION: Xaa is D-Glutamic acid
<220> FEATURE:
<221> NAME/KEY: MISC_FEATURE
<222> LOCATION: (12)..(12)
<223> OTHER INFORMATION: Xaa is  L-Citrulline

<400> SEQUENCE: 12

Arg Arg Xaa Cys Tyr Xaa Lys Xaa Pro Tyr Arg Xaa Cys Arg
1               5                   10

<210> SEQ ID NO 13
<211> LENGTH: 14
<212> TYPE: PRT
<213> ORGANISM: Artificial Sequence
<220> FEATURE:
<223> OTHER INFORMATION: TZ14011 peptide
<220> FEATURE:
<221> NAME/KEY: MISC_FEATURE
<222> LOCATION: (3)..(3)
<223> OTHER INFORMATION: Xaa is L-3-(2)-naphthyl)alanine
<220> FEATURE:
<221> NAME/KEY: MISC_FEATURE
<222> LOCATION: (6)..(6)
<223> OTHER INFORMATION: Xaa is L-Citrulline
<220> FEATURE:
<221> NAME/KEY: MISC_FEATURE
<222> LOCATION: (8)..(8)
<223> OTHER INFORMATION: Xaa is D-Lysine
<220> FEATURE:
<221> NAME/KEY: MISC_FEATURE
<222> LOCATION: (12)..(12)
<223> OTHER INFORMATION: Xaa is L-Citrulline

<400> SEQUENCE: 13

Arg Arg Xaa Cys Tyr Xaa Lys Xaa Pro Tyr Arg Xaa Cys Arg
1               5                   10

<210> SEQ ID NO 14
<211> LENGTH: 20
<212> TYPE: PRT
<213> ORGANISM: Artificial Sequence
<220> FEATURE:
<223> OTHER INFORMATION: GW-H1 peptide

<400> SEQUENCE: 14

Gly Tyr Asn Tyr Ala Lys Lys Leu Ala Asn Leu Ala Lys Lys Phe Ala
1               5                   10                  15

Asn Ala Leu Trp
            20
```

```
<210> SEQ ID NO 15
<211> LENGTH: 13
<212> TYPE: PRT
<213> ORGANISM: Artificial Sequence
<220> FEATURE:
<223> OTHER INFORMATION: A5G27

<400> SEQUENCE: 15

Arg Leu Val Ser Tyr Asn Gly Ile Ile Phe Phe Leu Lys
1               5                   10

<210> SEQ ID NO 16
<211> LENGTH: 69
<212> TYPE: PRT
<213> ORGANISM: Artificial Sequence
<220> FEATURE:
<223> OTHER INFORMATION: FNI/II/V

<400> SEQUENCE: 16

Trp Gln Pro Pro Arg Ala Arg Ile Thr Gly Tyr Ile Ile Lys Tyr Glu
1               5                   10                  15

Lys Pro Gly Ser Pro Pro Arg Glu Val Val Pro Arg Pro Arg Pro Gly
            20                  25                  30

Val Thr Glu Ala Thr Ile Thr Gly Leu Glu Pro Gly Thr Glu Tyr Thr
        35                  40                  45

Ile Tyr Val Ile Ala Leu Lys Asn Asn Gln Lys Ser Glu Pro Leu Ile
    50                  55                  60

Gly Arg Lys Lys Thr
65

<210> SEQ ID NO 17
<211> LENGTH: 18
<212> TYPE: PRT
<213> ORGANISM: Artificial Sequence
<220> FEATURE:
<223> OTHER INFORMATION: Seq-1-7 peptide

<400> SEQUENCE: 17

Lys Tyr Leu Ala Tyr Pro Asp Ser Val His Ile Trp Arg Lys Arg Lys
1               5                   10                  15

Arg Lys

<210> SEQ ID NO 18
<211> LENGTH: 19
<212> TYPE: PRT
<213> ORGANISM: Artificial Sequence
<220> FEATURE:
<223> OTHER INFORMATION: Seq-1-8 peptide

<400> SEQUENCE: 18

Lys Tyr Leu Ala Tyr Pro Asp Ser Val His Ile Trp Arg Lys Arg Lys
1               5                   10                  15

Arg Lys Arg

<210> SEQ ID NO 19
<211> LENGTH: 22
<212> TYPE: PRT
<213> ORGANISM: Artificial Sequence
<220> FEATURE:
<223> OTHER INFORMATION: Angiopep-2-7 peptide

<400> SEQUENCE: 19

Thr Phe Phe Tyr Gly Gly Ser Arg Gly Lys Arg Asn Asn Phe Lys Thr
```

```
1               5                   10                  15

Glu Glu Tyr Arg Lys Arg
                20

<210> SEQ ID NO 20
<211> LENGTH: 31
<212> TYPE: PRT
<213> ORGANISM: Artificial Sequence
<220> FEATURE:
<223> OTHER INFORMATION: Nucleolin binding peptide

<400> SEQUENCE: 20

Lys Asp Glu Pro Gln Arg Arg Ser Ala Arg Leu Ser Ala Lys Pro Ala
1               5                   10                  15

Pro Pro Lys Pro Glu Pro Lys Pro Lys Ala Pro Ala Lys Lys
                20                  25                  30

<210> SEQ ID NO 21
<211> LENGTH: 39
<212> TYPE: PRT
<213> ORGANISM: Artificial Sequence
<220> FEATURE:
<223> OTHER INFORMATION: Nucleolin binding peptide

<400> SEQUENCE: 21

Lys Asp Glu Pro Gln Arg Arg Ser Ala Arg Leu Ser Ala Lys Pro Ala
1               5                   10                  15

Pro Pro Lys Pro Glu Pro Lys Pro Lys Ala Pro Ala Lys Lys Arg
                20                  25                  30

Lys Arg Lys Arg Lys Arg Lys
                35

<210> SEQ ID NO 22
<211> LENGTH: 98
<212> TYPE: PRT
<213> ORGANISM: Artificial sequence
<220> FEATURE:
<223> OTHER INFORMATION: Stefin A

<400> SEQUENCE: 22

Met Ile Pro Gly Gly Leu Ser Glu Ala Lys Pro Ala Thr Pro Glu Ile
1               5                   10                  15

Gln Glu Ile Val Asp Lys Val Lys Pro Gln Leu Glu Glu Lys Thr Asn
                20                  25                  30

Glu Thr Tyr Gly Lys Leu Glu Ala Val Gln Tyr Lys Thr Gln Val Val
            35                  40                  45

Ala Gly Thr Asn Tyr Tyr Ile Lys Val Arg Ala Gly Asp Asn Lys Tyr
        50                  55                  60

Met His Leu Lys Val Phe Lys Ser Leu Pro Gly Gln Asn Glu Asp Leu
65                  70                  75                  80

Val Leu Thr Gly Tyr Gln Val Asp Lys Asn Lys Asp Asp Glu Leu Thr
                85                  90                  95

Gly Phe

<210> SEQ ID NO 23
<211> LENGTH: 14
<212> TYPE: PRT
<213> ORGANISM: Artificial sequence
<220> FEATURE:
<223> OTHER INFORMATION: Linker sequence

<400> SEQUENCE: 23
```

Ser Gly Gly Thr Ser Gly Ser Thr Ser Gly Thr Gly Ser Thr
1               5                   10

<210> SEQ ID NO 24
<211> LENGTH: 15
<212> TYPE: PRT
<213> ORGANISM: Artificial sequence
<220> FEATURE:
<223> OTHER INFORMATION: Linker sequence

<400> SEQUENCE: 24

Ala Gly Ser Ser Thr Gly Ser Ser Thr Gly Pro Gly Ser Thr Thr
1               5                   10                  15

<210> SEQ ID NO 25
<211> LENGTH: 7
<212> TYPE: PRT
<213> ORGANISM: Artificial sequence
<220> FEATURE:
<223> OTHER INFORMATION: Linker sequence

<400> SEQUENCE: 25

Gly Gly Ser Gly Gly Ala Pro
1               5

<210> SEQ ID NO 26
<211> LENGTH: 8
<212> TYPE: PRT
<213> ORGANISM: Artificial sequence
<220> FEATURE:
<223> OTHER INFORMATION: Linker sequence

<400> SEQUENCE: 26

Gly Gly Gly Val Glu Gly Gly Gly
1               5

<210> SEQ ID NO 27
<211> LENGTH: 10
<212> TYPE: PRT
<213> ORGANISM: Artificial sequence
<220> FEATURE:
<223> OTHER INFORMATION: Linker sequence

<400> SEQUENCE: 27

Pro Lys Pro Ser Thr Pro Pro Gly Ser Ser
1               5                   10

<210> SEQ ID NO 28
<211> LENGTH: 11
<212> TYPE: PRT
<213> ORGANISM: Artificial sequence
<220> FEATURE:
<223> OTHER INFORMATION: Linker sequence

<400> SEQUENCE: 28

Ala Pro Ala Glu Thr Lys Ala Glu Pro Met Thr
1               5                   10

<210> SEQ ID NO 29
<211> LENGTH: 5
<212> TYPE: PRT
<213> ORGANISM: Artificial sequence
<220> FEATURE:
<223> OTHER INFORMATION: Linker sequence

<400> SEQUENCE: 29

```
Ala Ala Ala Leu Glu
1               5

<210> SEQ ID NO 30
<211> LENGTH: 5
<212> TYPE: PRT
<213> ORGANISM: Artificial sequence
<220> FEATURE:
<223> OTHER INFORMATION: Protease cleavage site

<400> SEQUENCE: 30

Asp Asp Asp Asp Lys
1               5

<210> SEQ ID NO 31
<211> LENGTH: 5
<212> TYPE: PRT
<213> ORGANISM: Artificial sequence
<220> FEATURE:
<223> OTHER INFORMATION: Protease cleavage site

<400> SEQUENCE: 31

Ile Glu Asp Gly Arg
1               5

<210> SEQ ID NO 32
<211> LENGTH: 6
<212> TYPE: PRT
<213> ORGANISM: Artificial sequence
<220> FEATURE:
<223> OTHER INFORMATION: Protease cleavage site

<400> SEQUENCE: 32

Leu Val Pro Arg Gly Ser
1               5

<210> SEQ ID NO 33
<211> LENGTH: 7
<212> TYPE: PRT
<213> ORGANISM: Artificial sequence
<220> FEATURE:
<223> OTHER INFORMATION: Protease cleavage site

<400> SEQUENCE: 33

Glu Asn Leu Tyr Phe Gln Gly
1               5

<210> SEQ ID NO 34
<211> LENGTH: 8
<212> TYPE: PRT
<213> ORGANISM: Artificial sequence
<220> FEATURE:
<223> OTHER INFORMATION: Protease cleavage site

<400> SEQUENCE: 34

Leu Glu Val Leu Phe Gln Gly Pro
1               5

<210> SEQ ID NO 35
<211> LENGTH: 7
<212> TYPE: PRT
<213> ORGANISM: Artificial sequence
<220> FEATURE:
<223> OTHER INFORMATION: Linker sequence

<400> SEQUENCE: 35

Gly Gly Ser Ser Arg Ser Ser
```

```
<210> SEQ ID NO 36
<211> LENGTH: 5
<212> TYPE: PRT
<213> ORGANISM: Artificial sequence
<220> FEATURE:
<223> OTHER INFORMATION: Linker sequence

<400> SEQUENCE: 36

Gly Gly Gly Asn Ser
1               5
```

THERAPEUTIC NANOCONJUGATES COMPRISING STEFIN A AND USES THEREOF

CROSS-REFERENCE TO RELATED APPLICATIONS

This application is filed under the provisions of 35 U.S.C. § 371 and claims the priority of International Patent Application No. PCT/EP2020/051048 filed on 16 Jan. 2020 entitled "THERAPEUTIC NANOCONJUGATES AND USES THEREOF" in the name of Antonio VILLAVERDE CORRALES, et al., which claims priority to European Patent Application No. 19382031.3, filed on 17 Jan. 2019, both of which are hereby incorporated by reference herein in their entirety.

FIELD OF THE INVENTION

The present invention relates to the field of nanostructured protein materials, more specifically to therapeutic agent-carrying fusion proteins which can be used in therapy.

BACKGROUND OF THE INVENTION

The systemic administration of drugs in form of nanoconjugates benefits from enhanced drug stability when compared to free molecules. Valuable additional properties such as cell targeting might be also merged into a given hybrid composite through the chemical incorporation of functional groups in nanoscale vehicles, taking profit from the high surface/volume ratio of nanomaterials. When administered systemically, the resulting drug loaded conjugates sizing between ~8 and 100 nm escape from renal filtration in absence of aggregation in lung or other highly vascularized organs. This fact, combined with appropriate physicochemical properties of the material might result in extended circulation time and prolonged drug exposure to target organs, thus enhancing the therapeutic impact and benefits for the patient.

Among the diversity of materials under investigation as drug carriers, that includes metals, ceramics, polymers and carbon nanotubes, proteins offer unique properties regarding biocompatibility and degradability that, in the context of rising nanotoxicological concerns, make them especially appealing. As the engineering of protein self-assembling into nanostructured materials is rapidly progressing and the control over the final geometry and physicochemical properties becomes tighter, protein materials are gaining functional and structural versatility as vehicles from chemically coupled drugs.

In fact, the attachment of a cytotoxic "payload" to an antibody to form an antibody-drug conjugate (ADC) has been shown to provide a mechanism for selective delivery of the cytotoxic agent to cancer cells via the specific binding of the antibody to cancer-selective cell surface molecules. Multiple examples of this strategy have been proved to be effective, like gemtuzumab ozogamicin, which comprises an anti-CD33 antibody conjugated to a highly potent DNA-targeting antibiotic, calicheamicin, which was used against acute myeloid leukemia. Also, maytansinoids, a highly potent microtubule-disrupting agents, have been tested as payloads for ADCs, resulting in the formulation ado-trastuzumab emtansine for treating HER2-positive breast cancer.

Nonetheless, the structural complexity of antibodies may become a cumbersome hindrance in terms of cost and synthesis. The inventors previously probed into the field of nanomedicine by applying a nanoarchitectonic principle based on the addition, to a core protein, of a cationic N-terminal domain plus a C-terminal poly-histidine. [Sema, N. et al. 2016. Nanomedicine, 12:1241-51]. It has been described in the art that these end-terminal tags and the resulting charge balance in the whole fusion promote self-assembling and oligomerization of monomeric proteins as robust toroid nanoparticles, stable in plasma [Cespedes, M. V. et al. 2014. ACS Nano., 8:4166-4176] and with high cellular penetrability if empowered with cell-targeting peptides. [Xu, Z. K. et al. 2015. Materials Letters, 154:140-3] The building blocks of these protein structures might also contain functional peptides such as cell-targeting agents, endosomolytic agents or nuclear localization signals, in form of fused stretches with modular organization.

Since current therapy methods still show a margin of failure, mostly due to tumor resistance phenomena which may result from intra-tumor clonal selection of those cells most resistant to the chemotherapy, for instance, there is still in the art a need for the development of more specific therapeutic approaches which can be targeted to the concrete tumor cells responsible for therapy failure and tumor progression while reducing the side and off-target effects of the therapeutic agents.

SUMMARY OF THE INVENTION

In a first aspect, the invention relates to a fusion protein comprising
  (i) a polycationic peptide,
  (ii) an intervening polypeptide region which is Stefin A or a variant thereof and
  (iii) a positively charged amino acid-rich region,
  wherein the intervening polypeptide region is conjugated to at least one Auristatin molecule.

In further aspects, the invention relates to a method to prepare the fusion protein of the first aspect, to a method to prepare nanoparticles comprising multiple copies of the fusion protein according to the first aspect of the invention, to a nanoparticle comprising multiple copies of the fusion protein of the invention or a nanoparticle which has been obtained by the method of the invention to prepare nanoparticles.

The invention also pertains to a fusion protein or a nanoparticle according to the invention for use in medicine.

In a final aspect, the invention relates to a fusion protein or a nanoparticle according to the invention for use in the treatment of cancer.

DETAILED DESCRIPTION OF THE INVENTION

Figure 1:
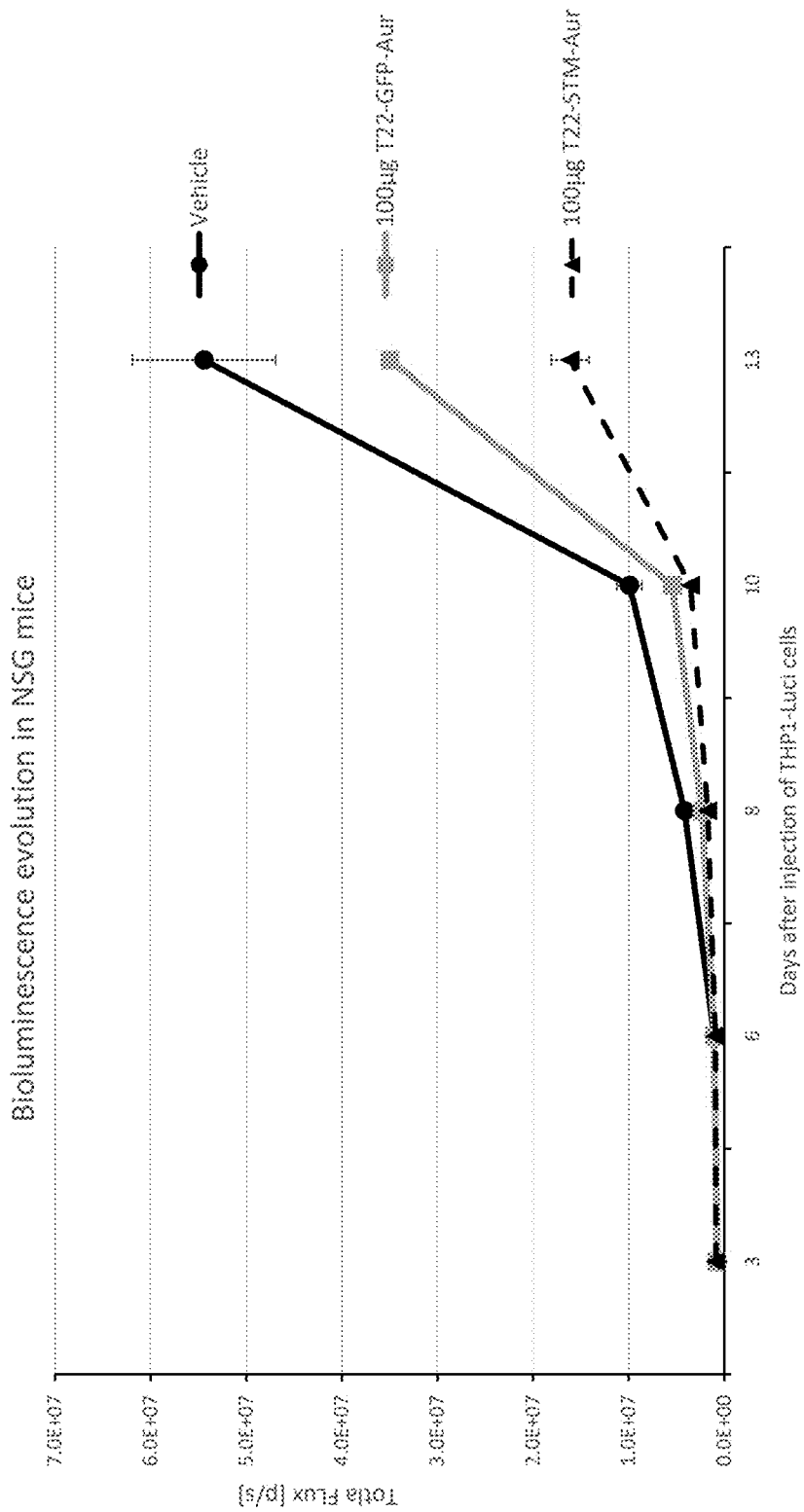
FIG. 1. Evolution of the bioluminescence over the time in the in vivo assays comparing the antitumor activity of T22-STM-Aur and T22-GFP-Aur. Both nanoconjugates were effective but antitumor activity was higher in the T22-STM-Aur group.

The inventors tested the principle behind the architecture of nanostructured proteins through the use of fusion proteins which included polycationic peptides with cell selectivity effects and proteins without an inherent physiological or biological activity. The fusion protein, later conjugated with therapeutic agents, the inventors observed that, surprisingly, the fusion proteins functioned as an effective target-selective delivery system for the therapeutic agents.

Fusion Proteins of the Invention

Thus, in a first aspect, the invention relates to a fusion protein comprising
  (i) a polycationic peptide,
  (ii) an intervening polypeptide region which is Stefin A or a variant thereof and
  (iii) a positively charged amino acid-rich region,
  wherein the intervening polypeptide region is conjugated to at least one auristatin molecule.

The term "fusion protein" is well known in the art, referring to a single polypeptide chain artificially designed which comprises two or more sequences from different origins, natural and/or artificial. The fusion protein, per definition, is never found in nature as such.

The term "single polypeptide chain", as used herein means that the polypeptide components of the fusion protein can be conjugated end-to-end but also may include one or more optional peptide or polypeptide "linkers" or "spacers" intercalated between them, linked by a covalent bond.

The term "peptide" or "polypeptide", as used herein, generally refers to a linear chain of around 2 to 40 amino acid residues joined together with peptide bonds. It will be understood that the terms "peptide bond", "peptide", "polypeptide" and protein are known to the person skilled in the art. From here on, "peptide" and "polypeptide" will be used indistinctly.

As used herein, an "amino acid residue" refers to any naturally occurring amino acid, any amino acid derivative or any amino acid mimic known in the art. In certain embodiments, the residues of the protein or peptide are sequential, without any non-amino acid interrupting the sequence of amino acid residues. In other embodiments, the sequence may comprise one or more non-amino acid moieties. In particular embodiments, the sequence of residues of the protein or peptide may be interrupted by one or more non-amino acid moieties.

The term "conjugate", as used herein, refers to any compound resulting from the covalent attachment of two or more individual compounds. In the present invention, conjugate refers to the intervening polypeptide region and at least one therapeutic agent which are covalently coupled, being said coupling direct or via a linking compound.

The terms "covalent coupling" or "covalent attachment" mean that the polypeptide region and at least one therapeutic agent are either directly covalently joined through a chemical covalent bond to one another, or else are indirectly covalently joined to one another through an intervening moiety or moieties, such as a linker, or a bridge, or a spacer, moiety or moieties.

A. The Polycationic Peptide

The term "polycationic peptide" or "first positively charged amino acid-rich region" as used herein, corresponds to a polypeptide sequence containing multiple positively charged amino acids. The polycationic peptide may be formed exclusively by positively charged amino acids or may contain other amino acids provided that the overall net charge of the region at pH 7 is positive.

It is well known in the art that amino acids and their corresponding amino acid residues possess different properties depending on their side chains and they may be grouped depending on those properties. Thus, at physiological pH, five amino acids show an electrical charge: arginine, histidine, and lysine are positively charged while aspartic acid and glutamic acid are negatively charged. The person skilled in the art will acknowledge then that the polycationic peptide of the invention corresponds to a polypeptide with a net electrical charge of more than one positive charge in physiological pH conditions. Accordingly, the polycationic peptide of the invention is not limited by the presence of one or more negatively charge amino acid residues as long as there are always enough positively charged amino acid residues to result in a net positive electrical charge of two or more.

Thus, in one embodiment of the invention, the polycationic peptide of the invention is selected from the group consisting of
  (i) an arginine-rich sequence,
  (ii) a sequence which is capable of specifically interacting with a receptor on a cell surface and promoting internalization of the fusion protein on said cell,
  (iii) the GW-H1 peptide,
  (iv) a CD44 ligand,
  (v) a peptide capable of crossing the blood-brain barrier,
  (vi) a cell penetrating peptide and
  (vii) a nucleolin-binding peptide.

(i) Arginine-Rich Sequence

As aforementioned, the arginine amino acid and its residue present positive charge at physiological pH. It will be understood that an "arginine-rich sequence" refers to a polypeptide sequence containing multiple arginine residues.

Thus, the polypeptide sequence may comprise 33%, preferably 40%, preferably 45%, preferably 50%, preferably 55%, preferably 60%, preferably 65%, preferably 70%, preferably 75%, preferably 80%, preferably 85%, more preferably 90%, more preferably 95%, even more preferably 99%, yet even more preferably 100% of the amino acid residues of its complete sequence as arginine residues. It will be understood that whenever the sequence of the arginine-rich sequence comprises less than the 100% of the sequence as arginine residues, these residues do not need to be all adjacent or contiguous with respect to each other.

The person skilled in the art will recognize that a polypeptide with one or more arginine residues will be a polycationic peptide as long as the total positive electrical charge of the polypeptide at physiological pH is 2 or more, resulting not only from the positive electrical charges of the arginine residues but also from any other positively charged amino acids.

In an embodiment of the invention, the polycationic peptide of the invention is an arginine-rich sequence.

In a preferred embodiment of the invention, the arginine-rich sequence of the polycationic peptide of the invention is selected from the group consisting of SEQ ID NO:1, SEQ ID NO: 2, SEQ ID NO: 3 and SEQ ID NO: 4.

(ii) Sequence which is Capable of Specifically Interacting with a Receptor on a Cell Surface and Promoting Internalization of the Fusion Protein on Said Cell The terms "sequence which is capable of specifically interacting with a receptor on a cell surface and promoting internalization of the fusion protein on said cell", as used herein, refers to any polypeptide sequence which binds to a receptor on the surface of a cell, wherein the receptor undergoes endocytosis in response to the binding of said polypeptide sequence. This binding specificity allows the delivery of the polypeptide sequence, as well as the rest of the fusion protein which it is a part of, to the cell, tissue or organ which expresses said receptor. In this way, a fusion protein comprising said polypeptide sequence will be directed specifically to said cells when administered to an animal or contacted in vitro with a population of cells of different types.

The term "receptor" denotes a cell-associated protein that binds to a bioactive molecule termed a "ligand". Both "receptor" and "ligand" are commonly known to those skilled in the art.

As used herein, "internalization" refers to a process by which a molecule or a construct comprising a molecule binds to a target element on the outer surface of the cell membrane and the resulting complex is internalized by the cell. Internalization may be followed up by dissociation of the resulting complex within the cytoplasm. The target element, along with the molecule or the construct, may then localize to a specific cellular compartment. Preferably, the polycationic peptide of the invention, besides promoting internalization, will facilitate endosomal escape of the fusion protein.

A wide array of uptake receptors and carriers, with an even wider number of receptor-specific ligands, are known in the art.

Non-limiting examples of receptors which may be targeted by the polycationic of the invention include an angiotensin receptor, a bombesin receptor, a bradykinin receptor, a calcitonin receptor, a chemokine receptor, a cholecystokinin receptor, a corticotropin-releasing factor receptor, an endothelin receptor, an ephrin receptor, a formylpeptide receptor, a Frizzled receptor, a galanin receptor, a the growth hormone secretagogue receptor (Ghrelin) receptor, a Kisspeptin receptor, a melanocortin receptor, Neuropeptide FF/neuropeptide AF receptor, a neuropeptide S receptor, a neuropeptide W/neuropeptide B receptor, a neuropeptide Y receptor, a neurotensin receptor, an orexin receptors, a peptide P518 receptor, a somatostatin receptor, a tachykinin receptor, a Toll-like receptor, a vasopressin and oxytocin receptor and a VEGF receptor.

In a preferred embodiment of the invention, the polycationic peptide comprising a sequence which is capable of specifically interacting with a receptor on a cell surface and promoting internalization of the fusion protein on said cell is a CXCR4 ligand.

The term "CXCR4", as used herein, refers to a G protein-coupled, seven-transmembrane chemokine receptor. Like other chemokine receptors, CXCR4 plays an important role in immune and inflammatory responses by mediating the directional migration and activation of leukocytes CXCR4 is expressed or overexpressed in a variety of cancer cell lines and tissues including breast, prostate, lung, ovarian, colon, pancreatic, kidney, and brain, as well as non-Hodgkin's lymphoma and chronic lymphocytic leukemia. The only known ligand to CXCR4 is stromal cell-derived factor- (SDF-1, or CXCL12). The interaction between CXCR4 and SDF-1 plays an important role in multiple phases of tumorigenesis, including tumor growth, invasion, angiogenesis, and metastasis.

The expression "specifically binding to CXCR4", as used herein refers to the ability of the conjugates of the invention to bind more frequently, more rapidly, with greater duration and/or with greater affinity to CXCR4 or cell expressing same than it does with alternative receptors or cells without substantially binding to other molecules. Binding affinity is measured, for instance, as described by Tamamura et al. by the oil-cushion method [see Hesselgesset et al, 1998, J. Immunol., 160:877-883] comprising contacting the peptide with CXCR4-transfected cell line (e.g. CHO cells) and a labeled CXCR4 ligand (e.g. $^{125}$I-SDF-1α) and measuring the inhibition percentage of the targeting peptide against the binding of the labeled CXCR4 ligand.

Specific binding can be exhibited, e.g., by a low affinity targeting agent having a Kd of at least about $10^{-4}$ M. e.g., if CXCR4 has more than one binding site for a ligand, a ligand having low affinity can be useful for targeting. Specific binding also can be exhibited by a high affinity ligands, e.g. a ligand having a Kd of at least about of $10^{-7}$ M, at least about $10^{-8}$ M, at least about $10^{-9}$ M, at least about $10^{-10}$ M, or can have a Kd of at least about $10^{-11}$ M or $10^{-12}$ M or greater. Both low and high affinity-targeting ligands are useful for incorporation in the conjugates of the present invention.

The ability of the conjugate of the invention to be internalized by cells expressing CXCR4 may be conveniently determined by fluorescence methods in the case that the conjugate comprises a fluorescent protein, such as GFP. Such fusion proteins can be obtained by preparing a recombinant nucleic acid wherein the nucleic acids encoding the T22 peptide and the fluorescent protein are fused in frame and expressed in an adequate host cell or organism. The fusion protein is then contacted with a culture of cells expressing CXCR4 or in vivo with a tissue which expresses CXCR4 for an appropriate amount of time, after which fluorescence microscopy may be used to determine whether the construct penetrated the cell. Presence of fluorescence in the cytoplasm may be further investigated by comparing the fluorescence microscopy image resulting from the fluorescent protein to that obtained with a known cytoplasmic stain.

The expression "facilitate endosomal escape", as used herein, refers to the ability of the polycationic peptide to induce the release of the fusion proteins from the endosomal compartment after internalization by receptor-mediated endocytosis.

In an even more preferred embodiment of the invention, the CXCR4 ligand is selected from the group comprising the T22 peptide (SEQ ID NO: 5), the V1 peptide (SEQ ID NO:6), the CXCL12 peptide (SEQ ID NO:7), the vCCL2 peptide (SEQ ID NO:8) or a functionally equivalent variant thereof.

The T22 peptide corresponds to a peptide derived from the protein polyphemusin II (extracted from hemocyte debris from *Lymulus polyphemus*). The vCCL2 corresponds to the viral macrophage inflammatory protein-II, a homologue of human chemokine CCL2 encoded by human herpesvirus 8. The V1 peptide corresponds to residues 1-21 of the N-terminus of vCCL2. CXCL12, C—X—C motif chemokine 12, also known as stromal cell-derived factor 1 (SDF1), is a member of the chemokine family that acts as a pro-inflammatory mediator. All four peptides are known to have interactions with the CXCR4 receptor, as shown in Liang, X. 2008. Chem. Biol. Drug. Des. 72:91-110.

In one embodiment, the targeting peptide is the selected from the group consisting of
- the T140 peptide having the sequence $RRX_1CYRKX_2PYRX_3CR$ (SEQ ID NO:9) wherein $X_1$ is L-3-(2-naphtyl)alanine, $X_2$ is D-Lys and $X_3$ is L-Citrulline.
- the TN14003 peptide having the sequence $RRX_1CYX_2KX_3PYRX_4CR$ (SEQ ID NO:10) wherein $X_1$ is L-3-(2-naphtyl)alanine, $X_2$ is L-Citrulline, $X_3$ is dLys and $X_4$ is L-Citrulline,
- the TC14012 peptide having the sequence $RRX_1CYEKX_2PYRX_3CR$ (SEQ ID NO:11) wherein $X_1$ is L-3-(2-naphtyl)alanine, $X_2$ is D-Citrulline and $X_3$ is L-Citrulline,
- the TE14011 peptide having the sequence $RRX_1CYX_2KX_3PYRX_4CR$ (SEQ ID NO:12) wherein $X_1$ is L-3-(2-naphtyl)alanine, $X_2$ is L-Citrulline, $X_3$ is D-Glu and $X_4$ is L-Citrulline and
- the TZ14011 peptide having the sequence $RRX_1CYX_2KX_3PYRX_4CR$ (SEQ ID NO:13) wherein $X_1$ is L-3-(2-naphtyl)alanine, $X_2$ is L-Citrulline, $X_3$ is D-Lys and $X_4$ is L-Citrulline or the variant thereof wherein the N-terminal Arginine residue is acetylated (known Ac-TZ14011).

The terms "functional variant" and "functionally equivalent variant" are interchangeable and are herein understood as all those peptides derived from the T22, the V1, the CXCL12, and/or the vCCL2 peptides by means of modification, insertion and/or deletion of one or more amino acids, provided that the function of binding to CXCR4 and internalizing the fusion protein is substantially maintained.

In one embodiment, functionally equivalent variants of the cationic polypeptides are those showing a degree of identity with respect to the human T22, V1, CXCL12 and/or the vCCL2 peptides, according to their respective SEQ ID NOs, greater than at least 40%, at least 50%, at least 60%, at least 70%, at least 80%, at least 85%, at least 90%, at least 95%, at least 96%, at least 97%, at least 98% or at least 99%. The degree of identity between two amino acid sequences can be determined by conventional methods, for example, by means of standard sequence alignment algorithms known in the state of the art, such as, for example BLAST [Altschul S. F. et al., J. Mol. Biol., 1990 Oct. 5; 215(3):403-10]. The cationic polypeptides of the invention may include post-translational modifications, such as glycosylation, acetylation, isoprenylation, myristoylation, proteolytic processing, etc.

Alternatively, suitable functional variants of the cationic polypeptide are those wherein one or more positions contain an amino acid which is a conservative substitution of the amino acid present in the T22, V1, CXCL12, and/or vCCL2 peptides mentioned above. "Conservative amino acid substitutions" result from replacing one amino acid with another having similar structural and/or chemical properties For example, the following six groups each contain amino acids that are conservative substitutions for one another: 1) Alanine (A), Serine (S), Threonine (T); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); and 6) Phenylalanine (F), Tyrosine (Y), Tryptophan (W). Selection of such conservative amino acid substitutions is within the skill of one of ordinary skill in the art and is described, for example by Dordo et al. et al., [J. Mol. Biol, 1999, 217; 721-739] and Taylor et al., [J. Theor. Biol., 1986, 119:205-218].

A suitable assay for determining whether a given peptide can be seen as a functionally equivalent variant thereof is, for instance, the following assay: a putative T22, V1, CXCL12 or vCCL2 peptide variant is fused in frame with a marker polypeptide (e.g. a fluorescent protein). Such fusion proteins can be obtained by preparing a recombinant nucleic acid wherein the nucleic acids encoding the peptide and the fluorescent protein are fused in frame and expressed in an adequate host cell or organism. The fusion protein is then contacted with a culture of cells CXCR4 (e.g. HeLa cells) for an appropriate amount of time after which fluorescence microscopy may be used to determine whether the construct penetrated the cell. If the peptide is a functionally equivalent variant of the corresponding peptide, the marker protein will be internalized and presence of fluorescence in the cytoplasm of the cell will be visible. Furthermore, the performance of the functionally equivalent variant can be assayed by comparing the fluorescence microscopy image resulting from the fluorescent protein to that obtained with a known cytoplasmic stain (e.g. DAPI).

(iii) The GW-H1 Peptide

The GW-H1 peptide was previously described by Chen and colleagues [Chen, Y-L. S. et al. 2012. Peptides, 36:257-265]. The GW-H1 peptide was first selected as an antimicrobial peptide but it is also characterized by its capability to bind to cell membranes, internalize itself to the cytoplasm, and migrate to the nuclei in eukaryotic cells. Once inside the cell, GW-H1 is capable induce apoptosis. It has been proposed that GW-H1 exerts its cytolytic activity by folding into an amphipathic helix [Chen and colleagues, supra]. Therefore, this peptide is supposed to exert its cell lytic effects by two sequential events consisting on binding to cell membranes followed by permeabilization.

In a preferred embodiment of the invention, the polycationic peptide of the invention is the GW-H1 peptide, which has the SEQ ID NO:14.

(iv) A CD44 Ligand CD44 is a cell-surface transmembrane glycoprotein involved in cell-cell and cell-matrix interactions, cell adhesion and migration. CD44 has been implicated in inflammation and in diseases such as cancer [Bajorath, J. 2000. Proteins. 39:103-111]. Many isoforms are known, which are expressed in a cell-specific manner and also differentially glycosylated.

Accordingly, a "CD44 ligand" will be a molecule capable of binding to CD44. CD44 is the major surface receptor for Hyaluronan, a component of the extracellular matrix, but it has other ligands, such as chondroitin sulfate, the heparin-biding domain of fibronectin, osteopontin, serglycin, collagen and laminin. Besides, CD44 can also interact with metalloproteinases and selectins.

In an embodiment of the invention, the polycationic peptide of the invention is a CD44 ligand. In a preferred embodiment of the invention, the CD44 ligand is selected from the group consisting of A5G27 (SEQ ID NO:15) and FNI/II/V (SEQ ID NO:16).

The peptide FNI/II/V corresponds to the HBFN-fragment V of Fibronectin. The peptide A5G27 corresponds to a peptide of the α5 chain of Laminin [Pesarrodona, M. et al. 2014. Int. J. of Pharmaceutics. 473:286-295].

(v) Peptide Capable of Crossing the Blood-Brain Barrier

It is well known in the art that one major obstacle for the development of therapeutic approaches for brain pathologies is the blood-brain barrier (BBB). The brain is shielded against potentially toxic substances by the presence of two barrier systems: the blood-brain barrier (BBB) and the blood-cerebrospinal fluid barrier (BCSFB). The BBB is considered to be the major route for the uptake of serum ligands since its surface area is approximately 5000-fold greater than that of BCSFB. The brain endothelium, which constitutes the BBB, represents the major obstacle for the use of potential drugs against many disorders of the CNS. As a general rule, only small lipophilic molecules may pass across the BBB, i.e., from circulating systemic blood to brain. Many drugs that have a larger size or higher hydrophobicity show promising results in animal studies for treating CNS disorders.

Therefore, a "peptide capable of crossing the blood-brain barrier" will be a peptide capable of transporting itself as well as any molecule it is bound to, preferably a protein, from the blood torrent to the CNS.

In 1983 it was reported that a peptide, β-Casomorphin-5 could overcome the BBB [Ermisch, A. et al. 1983. J. of Neurochemistry. 41:1229-1233]. Since then, many other peptides with BBB-permeating properties have been identified, characterized and catalogued, and in 2012 a comprehensive database was established, as reported by Van Dorpe et al. [Van Dorpe, S. et al. 2012. Brain Struct. Funct. 217:687-718]. Most of the peptides listed in the aforementioned database are suitable for the fusion protein of the invention.

In an embodiment of the invention, the polycationic peptide of the invention is a peptide capable of crossing the blood-brain barrier. In a preferred embodiment of the invention, the peptide capable of crossing the blood-brain barrier is a selected from the group consisting of Seq-1-7 (SEQ ID NO:17), Seq-1-8 (SEQ ID NO:18), and Angiopep-2-7 (SEQ ID NO:19).

(vi) Cell Penetrating Peptide (CPP)

The terms "cell-penetrating peptide" (CPP) refers to a peptide, typically of about 5-60 amino acid residues in length, that can facilitate cellular uptake of molecular cargo, particularly proteins they are a part of Proteins can present one or more CPPs. CPPs can also be characterized as being able to facilitate the movement or traversal of molecular cargo across/through one or more of a lipid bilayer, cell membrane, organelle membrane, vesicle membrane, or cell wall. A CPP herein will be polycationic.

Examples of CPPs useful herein, and further description of CPPs in general, are disclosed in Schmidt et al. [2010. FEBS Lett. 584:1806-1813], Holm et al. [2006. Nature Protocols 1:1001-1005], Yandek et al, [2007. Biophys. J. 92:2434-2444], Morris et al. [2001. Nat. Biotechnol. 19:1173-1176]. and U.S. Patent Application Publication No. 2014/0068797. CPPs do not depend on transporters or receptors, facilitating the traffic of the proteins they are part of directly through the lipid bilayer without the need of participation by any other cell components.

(vii) Nucleolin-Binding Peptide

Accordingly, a "nucleolin-binding peptide" is a peptide capable of binding to the nucleolin protein in a cell, preferably to the cell-surface expressed fraction of nucleolin. In an embodiment of the invention, the polycationic peptide of the invention is a nucleolin-binding peptide.

The International Patent Application Publication with number WO 2011/031477 A2 offers numerous examples of nucleolin-binding peptides that would be suitable for use in the fusion protein of the invention.

In a preferred embodiment of the invention, the nucleolin-binding peptide of the invention is the peptide of sequence SEQ ID NO:20 or the peptide of sequence SEQ ID NO:21.

B. Intervening Polypeptide Region

The second element in the fusion protein according to the invention is an intervening polypeptide, which is a Stefin A polypeptide or a functionally equivalent variant thereof.

The terms "intervening polypeptide region" and "intervening region" are herein considered equivalent and used to refer to a polypeptide sequence which is located between the polycationic peptide (i) and the positively charged amino acid region (ii).

The term "Stefin A", as used herein, refers to a small (98 amino acid) monomeric protein inhibitor of the cystatin family I (stefins) that inhibits cysteine proteases of the cathepsin family by interacting with its partner proteins, cathepsins B, C, H, L and S using three sites, with key contacts made by glycine at position 4, valine at position 48 and lysine at position 73.

In a preferred embodiment, the Stefin A used as intervening polypeptide in the present invention is a biologically inactive, i.e. it is not capable of inhibiting cysteine proteases of the cystatin I family. The lack of biological activity of the Stefin A used in the fusion proteins according to the present invention can be determined in a routine manner by measuring cathepsin B and/or H activity in the presence of the Stefin A variant using the assays described, e.g. in Woodman et al. (J. Mol. Biol. (2005) 352, 1118-1133).

In another embodiment, the Stefin A used in the present invention is the human Stefin A polypeptide, the sequence of which is provided in the NCBI database with accession number NP_005204.1 (release date of 23 Nov. 2018) or a biologically inactive variant thereof. The invention also contemplates the use as intervening polypeptides of orthologues of the human Stefin A, such as the rat Stefin A), the bovine Stefin A (accession number NP_001161296 in the NCBI database with a release date of 11 Nov. 2018), the mouse Stefin A (accession number NP_001028411.1 in the NCBI database with a release date of 10 Nov. 2018) or variants thereof which are biologically inactive.

The term "functionally equivalent variant", when used herein to refer to Stefin A, refers to any polypeptide or peptide resulting from the addition, deletion or substitution of one or more amino acid residues from the sequence of said Stefin A and which substantially maintain the capacity of wild type Stefin A of forming nanoparticles when forming part of a fusion protein flanked by a polycationic peptide and a positively charged amino acid-rich region as defined in the present invention. The capacity of a Stefin A variant to form nanoparticles can be determined, for example, by Dynamic Light Scattering and MALDI-TOF mass spectrometry as explained in the Examples. It will be understood that the Stefin A functionally equivalent variants which are used in the fusion proteins according to the present invention, while being capable of maintaining the capacity of the of wild type Stefin A of forming nanoparticles when forming part of a fusion protein flanked by a polycationic peptide, are at the same time biologically inactive.

Functional variants of Stefin A according to the invention include polypeptides showing a sequence identity with the sequence of said Stefin A of at least 50%, at least 60%, at least 70%, at least 80%, at least 90%, at least 91%, at least 92%, at least 93%, at least 94%, at least 95%, at least 96%, at least 97%, at least 98%, or at least 99% that retain capacity to assemble in the 24-mer protein with an inner cavity. Likewise, functional equivalent variants of Stefin A according to the invention will preferably maintain a capacity of forming nanoparticles when forming part of a fusion protein flanked by a polycationic peptide and a positively charged amino acid-rich region as defined in the present invention which is at least 50%, at least 60%, at least 70%, at least 80%, at least 90%, at least 91%, at least 92%, at least 93%, at least 94%, at least 95%, at least 96%, at least 97%, at least 98%, or at least 99% of the capacity of the wild type Stefin A. The degree of identity between two proteins or peptides can be determined by using computer-implemented algorithms and methods that are widely known by those skilled in the art. By illustrative, the identity between two amino acid sequences is determined by using the BLASTP algorithm (BLAST Manual, Altschul, S., et al., NCBI NLM NIH Bethesda, Md. 20894, Altschul, S., et al., J. Mol. Biol., 1990, 215:403-410). The reassembly of the ferritin nanoparticles can be evaluated with native gel electrophoresis or size-exclusion chromatography (Anal Biochem. 1987, 166(2): 235-45).

Alternatively, suitable functional variants of the Stefin A polypeptide are those wherein one or more positions contain an amino acid which is a conservative substitution of the amino acid present in the Stefin A polypeptide. "Conservative amino acid substitutions" result from replacing one amino acid with another having similar structural and/or chemical properties For example, the following six groups each contain amino acids that are conservative substitutions for one another: 1) Alanine (A), Serine (S), Threonine (T); 2) Aspartic acid (D), Glutamic acid (E); 3) Asparagine (N), Glutamine (Q); 4) Arginine (R), Lysine (K); 5) Isoleucine (I), Leucine (L), Methionine (M), Valine (V); and 6) Phenylalanine (F), Tyrosine (Y), Tryptophan (W). Selection of such conservative amino acid substitutions is within the skill of one of ordinary skill in the art and is described, for example by Dordo et al. et al., [J. Mol. Biol, 1999, 217; 721-739] and Taylor et al., [J. Theor. Biol., 1986, 119:205-218].

In one embodiment, the Stefin A variant may be a fragment of Stefin A with a deletion of at least 1 amino acid from its N-terminus, and/or a deletion of at least 1 amino acid from its C-terminus. Functional variants of Stefin A considered within the context of this invention include polypeptides the sequence of which is derived from the sequences mentioned above by the deletion of at least 1 amino acid, at least 2 amino acids, at least amino acids, at least 4 amino acids, at least 5 amino acids, at least 10 amino acids, at least 15 amino acids, at least 20 amino acids, at least 30 amino acids, at least 40 amino acids, at least 50 amino acids, at least 60 amino acids, at least 70 amino acids, at least amino acids, at least 90 amino acids, at least 100 amino acids from its N-terminus, and/or a deletion of at least 1 amino acid, at least 2 amino acids, at least 3 amino acids, at least 4 amino acids, at least 5 amino acids, at least 10 amino acids, at least 15 amino acids, at least 20 amino acids, at least 30 amino acids, at least 40 amino acids, at least amino acids, at least 60 amino acids, at least 70 amino acids, at least 80 amino acids, at least 90 amino acids, at least 100 amino acids from its C-terminus.

It will be understood that the intervening peptide need to be physiologically functional once it is incorporated into the fusion protein of the invention. Accordingly, linker regions connecting the different elements of the fusion protein according to the invention are not considered intervening regions. Thus, in preferred embodiments, the intervening region comprises at least 5, at least 10, at least 15, at least 20, at least 25, at least 30, at least 35, at least 40, at least 50, at least 60, at least 70, at least 80, at least 90, at least 100 or more amino acids.

The intervening polypeptide in the fusion proteins according to the invention is Stefin A, also known as cystatin A. In a preferred embodiment, Stefin A is of human origin having the sequence SEQ ID NO: 22. In yet another embodiment, the cystatin is a Stefin A variant having one or more mutations selected from the group consisting of the G4W, the G4R, the V48D, the V48L, the G50S, the K71N, the S72G, the L73P, the L82R, the T83S mutations. In other embodiments, the Atefin A variant contains the following mutations with respect to the sequence shown in SEQ ID NO: 22:

G4W, V48D, K71N, S72G and L73P, corresponding to the mutant defined as STM mutant in Woodward et al. (J. Mol. Biol. (2005) 352, 1118-1133) and in Hoffman et al., Protein Engineering, Design & Selection vol. 23 no. 5 pp. 403-413, 2010).

G4R, V48L, G50S, K71N, S72G, L73P, L82R and T83S, corresponding to the mutant defined as SQM mutant in Hoffman et al., supra.).

G4R corresponding to the mutant defined as SUN mutant in Hoffman et al., supra.).

V48L and G50S corresponding to the mutant defined as SUM mutant in Hoffman et al., supra.).

K71N, S72G, L73P, L82R and T83S corresponding to the mutant defined as SUC mutant in Hoffman et al., supra.).

V48L, G50S, K71N, S72G, L73P, L82R and T83S, corresponding to the mutant defined as SDM mutant in Hoffman et al., supra.).

C. Positively Charged Amino Acid-Rich Region

The term "positively charged amino acid" or "second positively charged amino acid-rich region" as used herein, refers to a polypeptide sequence, different from the polycationic region or first positively charged amino acid-rich region characterized in that it contains multiple positively charged amino acids. In addition, the positively charged amino acid-rich region may be formed exclusively by positively charged amino acids or may contain other amino acids provided that the overall net charge of the region at pH 7 is positive. Thus, the positively charged amino acid-rich region sequence may comprise 33%, preferably 40%, preferably 45%, preferably 50%, preferably 55%, preferably 60%, preferably 65%, preferably 70%, preferably 75%, preferably 80%, preferably 85%, more preferably 90%, more preferably 95%, even more preferably 99%, yet even more preferably 100% of the amino acid residues of its complete sequence as positively charged amino acids residues.

The positively charged amino acid-rich region may contain only one type of positively charged amino acid or may contain more than one type of positively charged amino acid. In one embodiment, the positively charged amino acid-rich region is a polyhistidine region. In one embodiment, the positively charged amino acid-rich region is a polyarginine region. In one embodiment, the positively charged amino acid-rich region is a polyhistidine region. In one embodiment, the positively charged amino acid-rich region comprises lysine and arginine residues. In one embodiment, the positively charged amino acid-rich region comprises lysine and histidine residues. In one embodiment, the positively charged amino acid-rich region comprises arginine and histidine residues. In one embodiment, the positively charged amino acid-rich region comprises lysine, arginine and histidine residues In some embodiments, the positively charged amino acid-rich region comprises at least 2, at least 3, at least 4, at least 5, at least 6, at least 7, at least 8, at least 9, at least 10, at least 11, at least 12, at least 13, at least 14, or at least 15 positively charged amino acids residues, wherein the positively charged amino acid can be histidine, lysine, arginine or combinations thereof.

In some embodiments, the positively charged amino acid-rich region comprises fewer than 100, fewer than 90, fewer than 80, fewer than 70, fewer than 60, fewer than 50, fewer than 40, fewer than 30, fewer than 29, fewer than 28, fewer than 27, fewer than 26, fewer than 25, fewer than 24, fewer than 23, fewer than 22, fewer than 21, fewer than 20, fewer than 19, fewer than 18, fewer than 17, fewer than 16, fewer than 15, fewer than 14, fewer than 13, fewer than 12, fewer than 11, fewer than 10 or less positively charged amino acids residues, wherein the positively charged amino acid can be histidine, lysine, arginine or combinations thereof.

In some embodiments, the positively charged amino acid-rich region comprises between and 50 amino acids, between 2 and 40 amino acids, between 2 and 30 amino acids, between 2 and 25 amino acids, between 2 and 20 amino acids, between 2 and 10 amino acids or between 2 and 8 amino acids.

In some embodiments, the positively charged amino acid-rich region comprises between and 50 amino acids, between 3 and 40 amino acids, between 3 and 30 amino acids, between 3 and 25 amino acids, between 3 and 20 amino acids, between 3 and 10 amino acids or between 3 and 8 amino acids. In some embodiments, the positively charged amino acid-rich region comprises between 4 and 50 amino acids, between 4 and 40 amino acids, between 4 and 30 amino acids, between 4 and 25 amino acids, between 4 and 20 amino acids, between 4 and 10 amino acids or between 4 and 8 amino acids. In some embodiments, the positively charged amino acid-rich region comprises between 5 and 50 amino acids, between 5 and 40 amino acids, between 5 and 30 amino acids, between 5 and 25 amino acids, between 5 and 20 amino acids, between 5 and 10 amino acids or between 5 and 8 amino acids.

In an embodiment of the invention, the positively charged amino acid-rich region of the fusion protein of the invention is a polyhistidine region. In a preferred embodiment of the invention, the polyhistidine region comprises between 2 and 10 contiguous histidine residues.

In an embodiment of the invention, the positively charged amino acid-rich region of the fusion protein of the invention is a polyarginine region. In a preferred embodiment of the invention, the polyarginine region comprises between 2 and 10 contiguous arginine residues.

In an embodiment of the invention, the positively charged amino acid-rich region of the fusion protein of the invention is a polylysine region. In a preferred embodiment of the invention, the polylysine region comprises between 2 and 10 contiguous polylysine residues.

D. Relative Positions of the Elements of the Fusion Proteins and Linking Elements The different elements of the fusion protein (polycationic peptide, intervening polypeptide region, and positively charged amino acid-rich region) of the invention can be placed in any relative order provided that the polycationic peptide and the positively charged amino acid-rich region are functional on any position of the fusion protein and also the intervening polypeptide region remains functional totally or in part.

As used herein, the terms "N-terminal end", "N-terminus", and "amino-terminal end" of a polypeptide are indistinct. Equally, the terms "C-terminal end", "C-terminus", and "carboxi-terminal end" are considered equivalent. The terms are of common usage for the person skilled in the art regarding the free moieties of the amino acids at the ends of the polypeptide chains comprised by a protein.

Thus, in an embodiment of the invention, the polycationic peptide of the fusion protein is located at the N-terminal end of the protein, while the positively charged amino acid-rich region of the fusion protein is located at the C-terminal end of the protein. In another embodiment of the invention, the positively charged amino acid-rich region of the fusion protein is located at the N-terminal end of the protein, while the polycationic peptide of the fusion protein is located at the C-terminal end of the protein. In another embodiment of the invention, the intervening polypeptide region can be located at either the C-terminal end or the N-terminal end of the fusion protein, while the polycationic peptide is in the middle position of the fusion protein and the positively charged amino acid-rich region is at the end of the fusion protein opposite the Intervening polypeptide region, or the positively charged amino acid-rich region is in the middle position of the fusion protein and the polycationic peptide is located at the end of the fusion protein opposite the Intervening polypeptide region.

Accordingly, the relative order of the elements of the fusion protein according to the invention, can be:

N-Polycationic peptide-Intervening region polypeptide—positively charged amino acid-rich region-C;

N-positively charged amino acid-rich region-Intervening region polypeptide-Polycationic peptide-C;

N-Polycationic peptide-positively charged amino acid-rich region-Intervening region polypeptide-C;

N-positively charged amino acid-rich region-Polycationic peptide-Intervening region polypeptide-C;

N-Intervening region polypeptide-Polycationic peptide-positively charged amino acid-rich region-C; or N-Intervening region polypeptide-positively charged amino acid-rich region-Polycationic peptide-C The terms "N-terminal end" and "C-terminal end" do not mean that the components need to be directly conjugated end-to-end, but that they maintain that relative order of positions regardless of the presence of additional elements at the end of either component or intercalated between them, such as linkers/spacers.

Therefore, the fusion protein of the invention comprises the aforementioned elements ((1) polycationic peptide, (2) intervening polypeptide region, and (3) positively charged amino acid-rich region) and these can be conjugated end-to-end but also may include one or more optional peptide or polypeptide "linkers" or "spacers" intercalated between them, linked, preferably by peptidic bond.

According to the invention, the spacer or linker amino acid sequences can act as a hinge region between components (1) and (2) and (2) and (3), allowing them to move independently from one another while maintaining the three-dimensional form of the individual domains, such that the presence of peptide spacers or linkers does not alter the functionality of any of the components (1), (2) and (3). In this sense, a preferred intermediate amino acid sequence according to the invention would be a hinge region characterized by a structural ductility allowing this movement. In a particular embodiment, said intermediate amino acid sequence is a flexible linker. The effect of the linker region is to provide space between the components (1) and (2) and (2) and (3). It is thus assured that the secondary and tertiary structure of component (1), (2) or (3) is not affected by the presence of either of the others. The spacer is of a polypeptide nature. The linker peptide preferably comprises at least 2 amino acids, at least 3 amino acids, at least 5 amino acids, at least 10 amino acids, at least 15 amino acids, at least 20 amino acids, at least 30 amino acids, at least 40 amino acids, at least 50 amino acids, at least 60 amino acids, at least 70 amino acids, at least 80 amino acids, at least 90 amino acids or approximately 100 amino acids.

The spacer or linker can be bound to components flanking the two components of the conjugates of the invention by means of covalent bonds, preferably by peptide bonds; and also preferably the spacer is essentially afunctional, and/or is not prone to proteolytic cleavage, and/or does not comprise any cysteine residue. Similarly, the three-dimensional structure of the spacer is preferably linear or substantially linear.

The preferred examples of spacer or linker peptides include those that have been used to bind proteins without substantially deteriorating the function of the bound peptides or at least without substantially deteriorating the function of one of the bound peptides. More preferably the spacers or linkers used to bind peptides comprise coiled coil structures.

Preferred examples of linker peptides comprise 2 or more amino acids selected from the group consisting of glycine, serine, alanine and threonine. A preferred example of a flexible linker is a polyglycine linker. The possible examples of linker/spacer sequences include SGGTSGSTSGTGST (SEQ ID NO:23), AGSSTGSSTGPGSTT (SEQ ID NO:24) or GGSGGAP (SEQ ID NO:25). These sequences have been used for binding designed coiled coils to other protein domains [Muller, K. M., Arndt, K. M. and Alber, T., Meth. Enzymology, 2000, 328: 261-281]. Further non-limiting examples of suitable linkers comprise the amino acid sequence GGGVEGGG (SEQ ID NO:26), the sequence of 10 amino acid residues of the upper hinge region of murine IgG3 (PKPSTPPGSS, SEQ ID NO:27), which has been used for the production of dimerized antibodies by means of a coiled coil [Pack, P. and Pluckthun, A., 1992, Biochemistry 31:1579-1584], the peptide of sequence APAETKAEPMT (SEQ ID NO:28), the peptide of sequence GAP, the peptide of sequence AAA and the peptide of sequence AAALE (SEQ ID NO:29).

Alternatively, the components of the conjugates of the invention can be connected by peptides the sequence of which contains a cleavage target for a protease, thus allowing the separation of any of the components. Protease cleavage sites suitable for their incorporation into the polypeptides of the invention include enterokinase (cleavage site DDDDK, SEQ ID NO:30), factor Xa (cleavage site IEDGR, SEQ ID NO:31), thrombin (cleavage site LVPRGS, SEQ ID NO:32), TEV protease (cleavage site ENLYFQG, SEQ ID NO:33), PreScission protease (cleavage site LEVLFQGP, SEQ ID NO:34), inteins and the like.

Thus, in an embodiment of the invention, the polycationic peptide is bound to the intervening polypeptide region through a linker. In another embodiment of the invention, the intervening polypeptide region is bound to the positively charged amino acid-rich region through a linker. In yet another embodiment of the invention, the polycationic peptide is bound to the intervening polypeptide region through a linker and the intervening polypeptide region is bound to the positively charged amino acid-rich region through a linker also.

As the person skilled in the art will acknowledge, the linkers connecting the polycationic peptide to the intervening polypeptide region and the intervening polypeptide region to the positively charged amino acid-rich region may comprise the same sequence or different ones with the aforementioned limitation that the presence and/or sequence of the linkers does not result in functional alterations of the polycationic peptide, the intervening polypeptide region, and/or the positively charged amino acid-rich region (for instance, but not limited to, due to secondary or tertiary structure modifications of the fusion protein or formation of disulfide bonds).

The aforementioned considerations regarding the relative positions from the N-terminal end to the C-terminal end of the elements of the fusion protein apply also in the presence of linkers between them, independently of the number of them or what elements they are placed between. Therefore, the possible combinations and relative orders of elements will be the following (wherein the numbering stated above for the elements is retained: (1) polycationic peptide, (2) intervening polypeptide region, (3) positively charged amino acid-rich region):

N-(1)-(2)-(3)-C
N-(1)-linker-(2)-(3)-C
N-(1)-(2)-linker-(3)-C
N-(1)-linker-(2)-linker-(3)-C
N-(3)-(2)-(1)-C
N-(3)-linker-(2)-(1)-C
N-(3)-(2)-linker-(1)-C
N-(3)-linker-(2)-linker-(3)-C
N-(2)-(1)-(3)-C
N-(2)-linker-(1)-(3)-C
N-(2)-(1)-linker-(3)-C
N-(2)-linker-(1)-linker-(3)-C
N-(2)-(3)-(1)-C
N-(2)-linker-(3)-(1)-C
N-(2)-(3)-linker-(1)-C
N-(2)-linker-(3)-linker-(1)-C
N-(1)-(3)-(2)-C
N-(1)-(3)-linker-(2)-C
N-(1)-linker-(3)-(2)-C
N-(1)-linker-(3)-linker-(2)-C
N-(3)-(1)-(2)-C
N-(3)-linker-(1)-(2)-C
N-(3)-(1)-linker-(2)-C
N-(3)-linker-(1)-linker-(2)-C In a preferred embodiment of the invention, the linkers of the fusion protein of the invention comprise the sequence GGSSRSS (SEQ ID NO:35) sequence of the GGGNS sequence (SEQ ID NO:36).

E. Auristatin

The intervening polypeptide region of the fusion proteins of the invention is a protein bound to a therapeutic agent which is Auristatin.

The term Auristatin, as used herein, refers to any member of the family of antimitotic agents that function as microtubule inhibitors. Auristatin derivatives are also included within the definition of the term "auristatin". Examples of auristatins include, but are not limited to, auristatin E (AE), monomethylauristatin E (MMAE), monomethylauristatin F (MMAF), and synthetic analogs of dolastatin. In one embodiment, the auristatin is "Monomethyl auristatin E" or "MMAE" which corresponds to the compound having IUPAC name: (2S)—N-[(2S)-1-[[(3R,4S,5S)-1-[(2S)-2-[(1R,2R)-3-[[(1S,2R)-1-hydroxy-1-phenylpropan-2-yl]amino]-1-methoxy-2-methyl-3-oxopropyl]pyrrolidin-1-yl]-3-methoxy-5-methyl-1-oxoheptan-4-yl]-methylamino]-3-methyl-1-oxobutan-2-yl]-3-methyl-2-(methylamino) butanamide
and CAS accession number 474645-27-7.

It will be understood that the activity of the MMAE may be reduced as a result of its conjugation to the fusion polypeptide, the invention contemplates that the cytotoxic activity of the auristatin once it is delivered to the inside of the cell is of at least 100%, at least 90%, at least 80%, at least 70%, at least 60%, at least 50% or less of the activity of the unconjugated therapeutic agent. Alternatively, since the purpose of the invention is to facilitate the action of the therapeutic agent by increasing its selectivity and reducing its off-target effects, it is contemplated that the effects of the therapeutic agent conjugated to the fusion protein may be synergic and exceed the parametrized values already known for the specific therapeutic agent. Accordingly, it is intended that some embodiments of the therapeutic agent conjugated to the fusion protein of the invention also show at least 101%, at least 105%, at least 110%, at least 115%, at least 120%, at least 125%, at least 130%, at least 135%, at least 140%, at least 145%, at least 150%, at least 175%, at least 200%, at least 300%, at least 400%, at least 500%, at least 1000%, or more of the functionality of the therapeutic agent alone.

F. Linkage of the Therapeutic Agent to the Intervening Region

The therapeutic agent is conjugated to the fusion protein of the invention. It is intended that the therapeutic agent, as aforementioned, is conjugated to the intervening region of the fusion protein without limitation of the position of the conjugation inside the intervening region with regards to the N-terminal and C-terminal ends. Accordingly, the therapeutic agent can be conjugated to the intervening polypeptide region in an equidistant position with respect to the N-terminal and C-terminal ends or it can be closer to either of them. Hence, the therapeutic agent can be conjugated to the intervening polypeptide region at a distance of 80, 75, 70, 65, 60, 55, 50, 45, 40, 35, 30, 25, 30, 25, 20, 15, 20, 10, or less amino acid residues from the N-terminal or C-terminal end, or at the same residue of the N-terminal or C-terminal end.

The only intended limitation in the conjugation position of the therapeutic agent is that the therapeutic agent and the elements of the fusion protein are functional and the conjugation of the therapeutic agent does not interfere with the activity of either therapeutic agent or the fusion protein. So, the therapeutic agent, the polycationic peptide, and the positively charged amino acid-rich region conserve at least 45%, at least 50%, at least 55%, at least 60%, at least 65%, at least 70%, at least 75%, at least 80%, at least 85%, at least 90%, preferably 95%, more preferably 99%, even more preferably 100% of their functionality with respect to the non-conjugated forms of the fusion protein and the therapeutic agent respectively.

It is intended that the therapeutic agent can either be conjugated directly to a residue of the intervening polypeptide of the fusion protein or its bond may be mediated by a linking moiety. "Linking moiety" as used herein, relates to a molecule connecting the therapeutic peptide to the intervening region of the fusion protein. It is also intended that the linking moiety is not limited in its chemical nature and/or structure; therefore, the linking moiety may be a polysaccharide, a polypeptide, a fatty acid, a phospholipid, or a chemical derivative thereof, among others. It is further intended that the therapeutic agent may be bound to the linking moiety through any chemical bond, such as peptide bond, isopeptide bond, amide bond, imine bond, and etcetera.

The person skilled in the art will acknowledge that the previous provisions regarding the functionality of the elements of the fusion protein and the therapeutic agent apply also whenever a coupler mediates the conjugation between the therapeutic agent and the fusion protein. Therefore, whenever the therapeutic agent is conjugated to the fusion protein through a linking moiety, the therapeutic agent, the polycationic peptide, and the positively charged amino acid-rich region conserve at least 45%, at least 50%, at least 55%, at least 60%, at least 65%, at least 70%, at least 75%, at least 80%, at least 85%, at least 90%, preferably 95%, more preferably 99%, even more preferably 100% of their functionality with respect to the non-conjugated forms of the fusion protein and the therapeutic agent respectively, regardless of the position of the conjugation in the intervening region, the chemical composition or structure of the linking moiety and the chemical nature of the bond/s between the linking moiety and the therapeutic agent and between the linking moiety and the intervening region.

Thus, in an embodiment of the invention, the therapeutic agent is bound to the intervening polypeptide region of the fusion protein directly.

In another embodiment of the invention, the therapeutic agent is bound to the intervening region of the fusion protein though a linking moiety.

In a preferred embodiment of the invention, the linking moiety that mediates the bond of the therapeutic agent to the intervening region of the fusion protein through is 6-Maleimidohexanoic acid N-hydroxysuccinimide ester. In another preferred embodiment, the linking moiety that mediates the bond of the therapeutic agent to the intervening region of the fusion protein through is 4-Maleimido hexanoic acid N-hydroxysuccinimide ester.

In some embodiments of the invention, the linking moiety binding the therapeutic agent to the intervening region of the fusion protein is susceptible to be processed by enzymes present in the cytoplasm, releasing the therapeutic agent from the fusion protein once the therapy agent conjugated to the fusion protein has been internalized in a cell.

As the person skilled in the art will recognize, the numerous residues of the polypeptidic chain of the intervening region of the fusion protein offer not only multiple positions wherein a therapeutic agent can be bound or linked but also the possibility of linking more than one molecule of the same or different therapeutic agents to the same fusion protein. As previously, it is intended that the provisions regarding the functionality of the elements of the fusion protein as well as the therapeutic agent/s are upheld and that the increase of the number of molecules of the same or of a different therapeutic agent, the binding of different therapeutic agents, their chemical nature, or their binding positions do not affect the effectiveness and functionality of each therapeutic agent.

Thus, in another embodiment of the invention, the intervening polypeptide of the fusion protein is conjugated to a plurality of therapeutic agents, wherein said plurality of therapeutic agents are the same or different.

G. Reporter Proteins

In another embodiment of the invention, the fusion protein of the invention further comprises a reporter protein.

The person skilled in the art will acknowledge the term "reporter protein" as referring to a protein resulting from the expression of a "reporter gene". Reporter proteins are well known and commonly used in the art as markers suitable for multiple purposes, such as location of the expression of the reporter genes in tissues, cells or subcellular locations, protein-protein interactions, transport across the plasmatic membranes or endomembranes, vesicular traffic, ligand-receptor interactions, etcetera.

Useful reporter proteins in the context of the present invention include luciferase-4-monooxygenase from *Photinus pyralis*, β-galactosidase, thymidine kinase, and the like. The reporter proteins also include fluorescent proteins, which have already been discussed.

The reporter protein comprised by the fusion protein of the invention is directly adjacent to the positively charged amino acid-rich region or separated by a linker. The relative position of the positively charged amino acid-rich region, however, remains as per the the aforementioned considerations about the relative position of the elements of the fusion protein. Hence, independently of the position of the fusion protein, the fluorescent protein is always adjacent to it, either directly or separated by a linker.

Accordingly, in the embodiments of the invention comprising a fluorescent protein, the possible relative positions of the elements of the fusion protein of the invention would fit the following scheme (wherein RP refers to a reporter protein and the numbering stated above for the elements is retained: (1) polycationic peptide, (2) intervening polypeptide region, (3) positively charged amino acid region):

N-(1)-(2)-RP-(3)-C
N-(1)-linker-(2)-RP-(3)-C
N-(1)-(2)-linker-RP-(3)-C
N-(1)-linker-(2)-linker-RP-(3)-C
N-(3)-RP-(2)-(1)-C
N-(3)-RP-linker-(2)-(1)-C
N-(3)-RP-(2)-linker-(1)-C
N-(3)-RP-linker-(2)-linker-(3)-C
N-(1)-(2)-RP-linker-(3)-C
N-(1)-linker-(2)-RP-linker-(3)-C
N-(1)-(2)-linker-RP-linker-(3)-C
N-(1)-linker-(2)-linker-RP-linker-(3)-C
N-(3)-linker-RP-(2)-(1)-C
N-(3)-linker-RP-linker-(2)-(1)-C
N-(3)-linker-RP-(2)-linker-(1)-C
N-(3)-linker-RP-linker-(2)-linker-(3)-C
N-(2)-(1)-RP-(3)-C
N-(2)-linker-(1)-RP-(3)-C
N-(2)-(1)-linker-RP-(3)-C
N-(2)-linker-(1)-linker-RP-(3)-C
N-(2)-RP-(3)-(1)-C
N-(2)-(3)-RP-(1)-C
N-(2)-linker-RP-(3)-(1)-C
N-(2)-linker-(3)-RP-(1)-C
N-(2)-RP-(3)-linker-(1)-C
N-(2)-(3)-RP-linker-(1)-C
N-(2)-linker-RP-(3)-linker-(1)-C
N-(2)-linker-(3)RP-linker-(1)-C
N-(1)-RP-(3)-(2)-C
N-(1)-(3)-RP-(2)-C
N-(1)-RP-(3)-linker-(2)-C
N-(1)-(3)-RP-linker-(2)-C
N-(1)-linker-RP-(3)-(2)-C
N-(1)-linker-(3)-RP-(2)-C
N-(1)-linker-RP-(3)-linker-(2)-C
N-(1)-linker-(3)-RP-linker-(2)-C
N-RP-(3)-(1)-(2)-C
N-(3)-RP-(1)-(2)-C
N-RP-(3)-linker-(1)-(2)-C
N-(3)-RP-linker-(1)-(2)-C
N-RP-(3)-(1)-linker-(2)-C
N-(3)-RP-(1)-linker-(2)-C
N-RP-(3)-linker-(1)-linker-(2)-C
N-(3)-RP-linker-(1)-linker-(2)-C Preferred Fusion Proteins of the Invention In a preferred embodiment, the fusion protein is the T22-STM-H6-Aur which comprises:
(i) The T22 peptide as polycationic peptide,
(ii) STM as intervening polypeptide region, corresponding to the variant of the human Stefin A containing the G4W, V48D, K71N, S72G and L73P mutations,
(iii) A hexahistidine region as positively charged amino acid-rich region,
(iv) auristatin as therapeutic agent Stoichiometry of the Fusion Protein and Nanoconjugates of the Invention The number of therapeutic agents which are conjugated to the fusion protein of the invention, while not being particularly limitative, will depend on the number of available residues in the intervening polypeptide which are available for chemical conjugation with the therapeutic agent. Since most conjugations occur via amino- or sulfhydryl groups present in the side chains of the amino acids forming part of the intervening polypeptide, the number of therapeutic agents conjugated to the fusion protein will depend on the number of lysine and arginine residues (for a conjugation via an amino groups in the side chains) or on the number of cysteine residues (for conjugation via sulfhydryl groups in the side chains) as well as on the yield of the conjugation reaction. Human Stefin A contains a total of one arginine residue and 12 lysine residues, which means that there are 13 sites containing side chains which can activated and derivatized with auristatin. Thus, depending on the reaction yield, the fusion protein of the invention is conjugated to at least 1, 2, 3, 4, 5, 6, 7, 8, 9, 10, 11, 12 or 13 auristatin molecules. In the case wherein the intervening polypeptide is the Stefin A STM variant, which contains the G4W, V48D, K71N, S72G and L73P mutations, one of the lysine residues is mutated to asparagine, which results in a Stefin A variant which contains 12 sites having side chains which can activated and derivatized with auristatin. Thus, depending on the reaction yield, the fusion protein of the invention is conjugated to at least 1, 2, 3, 4, 5, 6, 7, 8, 9, 10, 11 or 12 auristatin molecules.

In addition, the nanoparticles according to the invention result from the assembly of multiple copies of the fusion proteins of the invention. In preferred embodiments, the nanoparticle comprises at least 2, 3, 4, 5, 6, 7, 8, 9, 10, 11, 12, 13, 14, 15, 17, 20, 25, more preferably at least 15 monomers of the fusion protein of the invention.

Accordingly, the total number of therapeutic agents attached to each nanoparticle will depend on (i) the number of therapeutic agents conjugated to each fusion protein, (ii) the oligomerization state of the therapeutic agents and (iii) the number of fusion proteins forming the nanoparticle. In preferred embodiments, the nanoparticle is conjugated to at least 30, 35, 40, 45, 50, 60, 65, 70, 57, 80, 85, 90, 59, 100, 125, 150, 175, 200, 225, 250, 275, 300 therapeutic agents. In a further preferred embodiment, the nanoparticle is conjugated to at least 30, 35, 40, 45, 50, 60, 65, 70, 57, 80, 85, 90, 59, 100, more preferably at least 60 molecules of the therapeutic agent.

Method for Preparing the Fusion Proteins of the Invention

In a second aspect, the invention relates to a method to prepare a fusion protein according to the invention comprising the steps of:
- a) providing a fusion protein comprising
  - i. a polycationic peptide,
  - ii. an intervening polypeptide region which is stefin A or a variant thereof and
  - iii. a positively charged amino acid-rich region, wherein the polycationic peptide and the positively charged amino acid-rich region are located at the ends of the protein and
- b) contacting said fusion protein with an activated form of wherein said activated form of a therapeutic agent contains a reactive group which is capable of reacting with at least one group in the intervening region of the fusion protein and wherein the contacting is carried out under conditions adequate for the formation of a bond between the reactive group in the therapeutic agent and the group in the intervening polypeptide region.

In a third aspect, the invention relates to a method to prepare a fusion protein according to the invention comprising the steps of:
- a) providing a fusion protein comprising
  - i. a polycationic peptide,
  - ii. an intervening polypeptide region which is Stefin A or a variant thereof and
  - iii. a positively charged amino acid-rich region, wherein the polycationic peptide and the positively charged amino acid-rich region are located at the ends of the protein and wherein the fusion protein is activated by the presence of at least reactive group in at least one residue within the intervening polypeptide which is capable of reacting with at least one group in the auristatin molecule and
- b) contacting said activated fusion protein with auristatin which contains a group which is capable of reacting with the reactive group in the fusion protein and wherein the contacting is carried out under conditions adequate for the formation of a bond between the reactive group in the fusion protein and the auristatin E.

The terms "fusion protein", "polycationic peptide", "Stefin A", "variant of Stefin A", "auristatin" and "positively charged amino acid-rich region" have been described above in detail and their meanings are equally applicable to the method for preparing the fusion protein as described herein.

The person skilled in the art will recognize that "reactive group", as used herein, refers to any moiety of a molecule which is capable of chemically reacting with another moiety from another molecule in such a fashion so as to bind the two molecules together, usually with the release of one or more additional molecules. Many such reactions are known in the art such as the formation of the peptide bond between a carboxyl and an amine group being one non-limiting example among them.

"Activated", as used herein when referring to a molecule, refers to a modified version of the molecule which contains a chemical modification whereby said molecule is capable to chemically react in a manner not previously present in the molecule (for instance, the activation adds a moiety not present previously, allowing for a bond that was unfeasible before) or with an increased reactivity (meaning that the reaction of the molecule with another molecule requires a lower activation energy than in the inactivated state). The present invention contemplates the possibility of activating the therapeutic agent and then contacting the activated therapeutic agent with the fusion protein or of activating the fusion protein and then contacting the activated fusion protein with the therapeutic agent.

In both cases, the activation of the fusion protein or of the therapeutic agent is usually carried out by reacting the molecule to be activated with a reagent that introduces the reactive group in a suitable moiety in the molecule to be activated. Examples of reactive groups that allow the therapeutic agent or fusion proteins to be activated include, but are not limited, to carboxyl, amine, imine, thiol, sulfone, hydroxyl, sulfate, and phosphate moieties, among many others which are commonly known to the person skilled in the art. The activated form of the therapeutic agent is also herein referred to as the "activated therapeutic agent". The activated form of the fusion protein is also herein referred to as the "activated fusion protein". The reactive group or groups in the activated fusion protein is or are located in the intervening region, although it is not excluded that additional reactive groups can also be found in other regions of the fusion protein.

In those embodiments of the invention wherein a linking moiety mediates the bond between the fusion protein and the therapeutic agent, the linking moiety is a bifunctional cross-linker and, more preferably, a heterobifunctional cross-linker, that reacts with the groups in the therapeutic agent and in the fusion protein, either sequentially (either reacting with the activated therapeutic agent first and then with the fusion protein, or first with the fusion protein and then with the activated therapeutic agent) or simultaneously, using among other linkages such as thioethers, amide bonds, carbon-nitrogen double bonds, or linkages generated by cycloaddition as disclosed in Kalia J et al. Advances in bioconjugation. Curr Org Chem 2010 January, 14(2):138-147). As a way of example typical thiol-reactive functional groups include iodoacetamides, maleimides, and disulfides. In addition, a protein can be treated with a small molecule or surface displaying an activated ester (e.g., an N-hydroxysuccinimidyl ester) to form amide bonds with the amino groups on lysine side chains and the N terminus. In another embodiment, the linking moiety is a heterobifunctional cross-linker which contains reactive groups capable of reacting with a thiol group and with an amino group. In one embodiment, the heterobifunctional cross-linker is 6-maleimidohexanoic acid N-hydroxysuccinimide ester.

In a preferred embodiment, the linking moiety reacts in a first step with the activated therapeutic agent and in a second step with the fusion protein. In another embodiment, the linking moiety reacts in a first step with the fusion protein and, in a second step, with the therapeutic agent.

It is intended that the step of contacting the fusion protein of the invention with the activated form of the therapeutic agent is carried out in a medium which favors the reaction establishing the bond between them. Media suitable for the reactions are commonly known to the person skilled in the art, including aqueous buffers and non-aqueous buffers. It is also intended that solid supports can be used in conjunction with the media for any of the reaction steps conducing to the synthesis of the activated therapeutic agent and the conjugate of the fusion protein, the therapeutic agent, and also the linking moiety in the embodiments that include one. Furthermore, it is intended that the method for the preparation of the conjugates between the fusion protein and the therapeutic agent is not limited to the fusion protein, the activated therapeutic agent, and the linking moiety, but that some embodiments include also the use of one or more catalysts and co-factors in the reaction.

Thus, in one embodiment of the invention, the activated form of the therapeutic agent contains a group which reacts with at least one of the side chains of a residue in a peptide region of the fusion protein, preferably in the intervening region of the fusion protein.

In another preferred embodiment said residue is an external lysine. In a further preferred embodiment of the invention, the group of the activated therapeutic agent, preferably the chemotherapeutic agent, which reacts with the side chain of the intervening region of the fusion protein is a thiol group.

In a further preferred embodiment, the linking moiety is 4-maleimido hexanoic acid N-hydroxysuccinimide ester which mediates the conjugation between the activated therapeutic agent and the side chain of the residue of the peptide region of the fusion protein indicated in the previous embodiments of this section. In a yet more preferred embodiment, the linking moiety 4-maleimido hexanoic acid N-hydroxysuccinimide ester is bound in a first step to auristatin and in a second step to the side chain in a residue of the fusion protein, more preferably to external lysines of the fusion protein, even more preferably to external lysines of the intervening region of the fusion protein.

It is also intended that the step of contacting the activated fusion protein of the invention with the therapeutic agent is carried out in a medium which favors the reaction establishing the bond between them. Media suitable for the reactions are commonly known to the person skilled in the art, including aqueous buffers and non-aqueous buffers. It is also intended that solid supports can be used in conjunction with the media for any of the reaction steps leading to the synthesis of the conjugate of the fusion protein and the therapeutic agent, and also the linking moiety in the embodiments that include one. Furthermore, it is intended that the method for the preparation of the conjugates between the fusion protein and the therapeutic agent is not limited to the fusion protein, the activated therapeutic agent, and the linking moiety, but that some embodiments include also the use of one or more catalysts and co-factors in the reaction.

Thus, in one embodiment of the invention, the activated form of the fusion protein contains a group which reacts with at least one moiety in the therapeutic agent. In a further preferred embodiment of the invention, the group of the therapeutic agent, preferably the chemotherapeutic agent, which reacts with the activated fusion protein is a thiol group.

In an even more preferred embodiment of the invention, the activated fusion protein agent is an amino functionalized fusion protein wherein one or more amino groups in the side chain of the amino acids forming part of the intervening polypeptide is modified with an activated group having thiol reactivity. In a further preferred embodiment, the linking moiety is 4-maleimido hexanoic acid N-hydroxysuccinimide ester mediates the conjugation between an amino group in the fusion protein and a thiol group in the therapeutic agent In a yet more preferred embodiment, the linking moiety 4-maleimido hexanoic acid N-hydroxysuccinimide ester is bound in a first step to the fusion protein, more preferably to external lysines of the fusion protein and in a second step to the therapeutic agent side chain in a residue of the fusion protein.

Nanoparticles of the Invention and Methods for their Preparation

In another aspect, the invention relates to a nanoparticle comprising multiple copies of the fusion protein according to the first aspect of the invention.

As the person skilled in the art will recognize, "nanoparticles" are microscopic particles whose size is measured in nanometers. The nanoparticles of the invention comprise the nanoparticles that result from the aggregation of multiple copies of the fusion protein of the invention as defined in the previous section. In the method for preparing nanoparticles with the fusion proteins of the invention, the preparation of the fusion protein of the invention comprises the monomeric form of the fusion proteins of the invention, which are thermodynamically favored to form non-covalent electrostatic unions and spontaneously aggregate in the conditions of the low salt buffer.

The person skilled in the art will acknowledge that the size of the nanoparticles can be in the range between 1 and 1000 nm, more preferably between 2.5 and 500 nm, even more preferably between 5 and 250 nm, and yet even more preferably between 10 and nm.

In addition, the nanoparticles according to the invention result from the assembly of multiple copies of the fusion proteins of the invention. In preferred embodiments, the nanoparticle comprises at least 2, 3, 4, 5, 6, 7, 8, 9, 10, 11, 12, 13, 14, 15, 17, 20, 25, more preferably at least 15 monomers of the fusion protein of the invention.

In another aspect, the invention relates to a method to prepare nanoparticles comprising multiple copies of the fusion protein according to the first aspect of the invention comprising placing a preparation of said fusion protein in a low salt buffer.

It will be understood that the expression "low salt buffer" comprises any buffer solution resulting from the dissolution of one or more salts in water with the capability to moderate changes in pH, wherein the amount of dissolved salt or salts results in an osmolarity lower or equal to that of the physiological fluids, such as the cytoplasm or the extracellular medium, for instance. Thus, the low salt buffer is understood to keep pH and osmolarity inside the range of physiological values and will be used inside the range of physiological temperatures.

The person skilled in the art will recognize that the range of physiological temperatures can oscillate between 15 and 45° C., more preferably between 2° and 40° C., even more preferably between 25 and 39° C., yet even more preferably between 3° and 37° C. The person skilled in the art will also acknowledge that the osmolarity of the low salt buffer will be in the range between 100 and 400 milli-osmoles/L (mOsm/L), preferably between 150 and 350 mOsm/L, more preferably between 200 and 300 mOsm/L, even more preferably between 225 and 275 mOsm/L.

Low salt buffers suitable for the invention, for instance, are the Tris-dextrose buffer (20 mM Tris +5% dextrose, pH 7.4), the Tris-NaCl buffer (20 mM Tris, 500 NaCl, pH 7.4), the PBS-glycerol buffer (phosphate buffered saline, PBS, pH 7.4, which is well known in the art, +10% glycerol), Tris Buffered Saline (TBS)-dextrose (20 mM Tris-HCl buffer pH 7.5, well known in the art, 200 NaCl, +5% dextrose), Tris Buffered Saline-Tween 20 (TBST) buffer (10 mM Tris-HCl pH 7.5, 200 mM NaCl, +0.01% Tween 20), or any physiological buffer known in the art with a pH not lower than 6.

In a preferred embodiment of the invention, the low salt buffer of the method of the invention is selected from the group consisting of a carbonate buffer, a Tris buffer and a phosphate buffer.

In a particularly preferred embodiment of the invention, the low salt buffer of the method of the invention is a carbonate buffer that comprises sodium bicarbonate at a concentration between 100 and 300 nM. In another particularly preferred embodiment of the invention, the low salt buffer of the method of the invention is a Tris buffer that comprises Tris at a concentration of between 10 and 30 nM. In another particularly preferred embodiment of the method of the invention, the low salt buffer of the invention is a phosphate buffer that comprises $Na_2HPO_4$ and $NaH_2PO_4$ at a total concentration of between 5 mM and 20 mM.

In an even more preferred embodiment of the invention, the low salt buffer of the method of the invention further comprises dextrose and/or glycerol.

In a yet more preferred embodiment of the invention, the low salt buffer of the method of the invention has a pH between 6.5 and 8.5.

In an even yet more preferred embodiment of the invention, the low salt buffer of the method of the invention is selected from the group consisting of
(i) 166 mM $NaHCO_3$, pH 7.4
(ii) 20 mM Tris, 500 mM NaCl, 5% dextrose, pH 7.4
(iii) 140 mM NaCl, 7.5 mM $Na_2HPO_4$, 2.5 mM $NaH_2PO_4$, 10% glycerol, pH 7.4

In another aspect of the invention, the invention relates to nanoparticles comprising multiple copies of the fusion protein of the first aspect of the invention or prepared according to the method or the invention for preparing nanoparticles.

Thus, the nanoparticles of the invention comprise aggregates of multiple copies of the fusion proteins of the invention, which result from the electrostatic interaction between regions in their structures favoring their non-covalent binding and coupling in physiological conditions. Since the method of the invention for the preparation of nanoparticles comprises placing a preparation of the fusion protein of the invention in a low salt buffer, it is understood that the nanoparticles thus formed comprise also an aggregate of multiple copies of the fusion protein.

In a preferred embodiment of the invention, the nanoparticles of the invention have a diameter between 10 and 100 nm.

In another aspect, the invention relates to a method for preparing a nanoparticle according to the invention wherein the nanoparticle are initially formed from the assembly of the fusion protein prior to its conjugation with the therapeutic agent and, in a second step, the nanoparticle is contacted with the therapeutic agent so that one or more copies of the therapeutic agent is/are conjugated to the preformed nanoparticle.

Thus, depending on whether the nanoparticles is activated or wherein the therapeutic agent is activated, the present invention relates to a method for obtaining a nanoparticle according to the invention which comprises
a) placing a preparation of a fusion protein comprising
   (i) a polycationic peptide,
   (ii) an intervening polypeptide region which is Stefin A or a variant thereof and
   (iii) a positively charged amino acid-rich region,
   wherein the polycationic peptide and the positively charged amino acid-rich region are located at the ends of the protein and wherein the fusion protein is provided in an activated form, wherein said activated form of the fusion protein contains a reactive group in the intervening region, said reactive group being capable of reacting with Auristatin and wherein said placing is carried out under conditions adequate for the formation of a nanoparticle containing a plurality of copies of the fusion protein and
b) contacting said nanoparticle with Auristatin under conditions adequate for the formation of a bond between the reactive group in the fusion protein and Auristatin.

Alternatively, the invention also relates to a method to prepare a nanoparticle according to the invention comprising the steps of.

b) placing a preparation of a fusion protein comprising
   i. a polycationic peptide,
   ii. an intervening polypeptide region which is stefin A or a variant thereof and
   iii. a positively charged amino acid-rich region,
   wherein the polycationic peptide and the positively charged amino acid-rich region are located at the ends of the protein and wherein said placing is carried out under conditions adequate for the formation of a nanoparticle containing a plurality of copies of the fusion protein and
b) contacting said fusion protein with an activated form of Auristatin wherein said activated form of Auristatin contains a reactive group which is capable of reacting with at least one group in the intervening region of the fusion protein and wherein the contacting is carried out under conditions adequate for the formation of a bond between the reactive group in Auristatin and one or more groups in the intervening polypeptide region.

The terms "fusion protein", "polycationic peptide", "intervening polypeptide region", "stefin A", "variant of Stefin A", "positively charged amino acid-rich region", "nanoparticle" and "activated" have been defined in detailed above and are equally applicable to the method for obtaining nanoparticles according to the invention.

The activation of the Auristatin or of the fusion protein can be carried out essentially as described above in the context of the methods for obtaining a fusion protein according to the invention. In one embodiment, the group within the fusion protein or within Auristatin that allow the fusion proteins or Auristatin to be activated include, but are not limited, to carboxyl, amine, imine, thiol, sulfone, hydroxyl, sulfate, and phosphate moieties, among many others which are commonly known to the person skilled in the art. In a preferred embodiment, the reactive group or groups in the activated fusion protein is or are located in the intervening region, although it is not excluded that additional reactive groups can also be found in other regions of the fusion protein.

In a preferred embodiment, the linking moiety that mediates the bond between the fusion protein and the therapeutic agent is a bifunctional cross-linker and, more preferably, a heterobifunctional cross-linker. In a preferred embodiment, the linking moiety reacts in a first step with the activated therapeutic agent and in a second step with the fusion protein. In another embodiment, the linking moiety reacts in a first step with the fusion protein and, in a second step, with the therapeutic agent.

Thus, in one embodiment of the invention, the activated form of the therapeutic agent contains a group which reacts with at least one of the side chains of a residue in a peptide region of the fusion protein, preferably in the intervening region of the fusion protein. In another preferred embodiment said residue is an external lysine. In a further preferred embodiment of the invention, the group of the activated therapeutic agent, preferably the chemotherapeutic agent, which reacts with the side chain of the intervening region of the fusion protein is a thiol group.

In a further preferred embodiment, the linking moiety is 4-maleimido hexanoic acid N-hydroxysuccinimide ester which mediates the conjugation between the activated therapeutic agent and the side chain of the residue of the peptide region of the fusion protein indicated in the previous embodiments of this section. In a yet more preferred embodiment, the linking moiety 4-maleimido hexanoic acid N-hydroxysuccinimide ester is bound in a first step to auristatin and in a second step to the side chain in a residue of the fusion protein, more preferably to external lysines of the fusion protein, even more preferably to external lysines of the intervening region of the fusion protein.

Therapeutic Uses of the Fusion Proteins and Nanoparticles of the Invention

In another aspect, the invention relates to a fusion protein or a nanoparticle according to the invention for use in medicine. In another aspect, the invention relates to the use of a fusion protein or a nanoparticle according to the invention for the treatment of a patient suffering from a disease that responds to the therapeutic agent forming part of the fusion protein of the invention.

As used herein, the terms "treat", "treatment" and "treating" refer to the reduction or amelioration of the progression, severity and/or duration of a condition, disorder or disease, or the amelioration of one or more symptoms (preferably, one or more discernible symptoms) of a condition, disorder or disease. The terms "treat", "treatment" and "treating" also refer to the amelioration of at least one measurable physical parameter of a condition, disorder or disease not necessarily discernible by the patient. Furthermore, "treat", "treatment" and "treating" refer also to the inhibition of the progression of a condition, disorder or disease, either physically by, e.g., stabilization of a discernible symptom, physiologically by, e.g., stabilization of a physical parameter, or both. "Treat", "treatment" and "treating" may refer, too, to the reduction or stabilization of the condition, disorder or disease.

It will be understood by the person skilled in the art that by use in medicine, the fusion protein or nanoparticle of the invention can be administered to a patient in order to induce a therapeutic response.

The therapeutic response comprises the suppression, reduction or arrest of the causes of the pathological condition or the disease suffered by a patient; the elimination, reduction, arrest or amelioration of the symptoms of the condition or disease; or the extinction, arrest or slowing down of the progression of the condition or disease in the patient.

The person skilled in the art will acknowledge that the fusion protein or nanoparticle of the invention suitable for use in medicine may be presented accompanied by a pharmaceutically acceptable carrier. As used herein, the term "pharmaceutically acceptable carrier" means a non-toxic, inert solid, semi-solid or liquid filler, diluent, encapsulating material or formulation auxiliary of any type. Remington's Pharmaceutical Sciences. Ed. by Gennaro, Mack Publishing, Easton, Pa., 1995 discloses various carriers used in formulating pharmaceutical compositions and known techniques for the preparation thereof.

Accordingly, the compositions comprising the fusion protein or nanoparticle of the invention and a pharmaceutically acceptable carrier are pharmaceutical compositions.

The pharmaceutical compositions of this invention can be administered to a patient by any means known in the art including oral and parenteral routes. According to such embodiments, inventive compositions may be administered by injection (e.g., intravenous, subcutaneous or intramuscular, intraperitoneal injection), rectally, vaginally, topically (as by powders, creams, ointments, or drops), or by inhalation (as by sprays).

A—Use of the Fusion Protein or the Nanoparticle of the Invention in the Treatment of Cancer.

Another embodiment of the invention relates to a fusion protein and the nanoparticle of the invention, or their corresponding pharmaceutical compositions, wherein the polycationic peptide is a sequence capable of specifically interacting with a receptor on a cell surface which is capable of promoting the internalization of the fusion protein into the cell for use in the treatment of cancer.

As used herein, the terms "treat", "treatment" and "treating" refer to the reduction or amelioration of the progression, severity and/or duration of cancer, or the amelioration of one or more symptoms (preferably, one or more discernible symptoms) of cancer. The terms "treat", "treatment" and "treating" also refer to the amelioration of at least one measurable physical parameter of cancer, such as growth of a tumor, not necessarily discernible by the patient. Furthermore, "treat", "treatment" and "treating" refer also to the inhibition of the progression of cancer, either physically by, e.g., stabilization of a discernible symptom, physiologically by, e.g., stabilization of a physical parameter, or both. "Treat", "treatment" and "treating" may refer, too, to the reduction or stabilization of tumor size or cancerous cell count.

The term "cancer" refers to a group of diseases involving abnormal, uncontrolled cell growth and proliferation (neoplasia) with the potential to invade or spread (metastasize) to other tissues, organs or, in general, distant parts of the organism; metastasis is one of the hallmarks of the malignancy of cancer and cancerous tumors. The abnormal growth and/or proliferation of cancerous cells is the result of a combination of genetic and environmental factors that alter their normal physiology. The growth and/or proliferation abnormalities of cancerous cells result in physiological disorders and, in many cases, death of the individual, due to the dysfunctionality or loss of functionality of the cell types, tissues and organs affected.

The term "cancer" includes, but is not restricted to, cancer of the breast, heart, small intestine, colon, spleen, kidney, bladder, head, neck, ovaries, prostate gland, brain, pancreas, skin, bone, bone marrow, blood, thymus, womb, testicles, hepatobiliary system and liver; in addition to tumors such as, but not limited to, adenoma, angiosarcoma, astrocytoma, epithelial carcinoma, germinoma, glioblastoma, glioma, hemangioendothelioma, hemangiosarcoma, hematoma, hepatoblastoma, leukemia, lymphoma, medulloblastoma, melanoma, neuroblastoma, hepatobiliary cancer, osteosarcoma, retinoblastoma, rhabdomyosarcoma, sarcoma and teratoma. Furthermore, this term includes acrolentiginous melanoma, actinic keratosis adenocarcinoma, adenoid cystic carcinoma, adenomas, adenosarcoma, adenosquamus carcinoma, astrocytic tumors, Bartholin gland carcinoma, basal cell carcinoma, bronchial gland carcinoma, capillary carcinoid, carcinoma, carcinosarcoma, cholangiocarcinoma, cystadenoma, endodermal sinus tumor, endometrial hyperplasia, endometrial stromal sarcoma, endometrioid adenocarcinoma, ependymal sarcoma, Ewing sarcoma, focal nodular hyperplasia, germ cell tumors, glioblastoma, glucagonoma, hemangioblastoma, hemagioendothelioma, hemagioma, hepatic adenoma, hepatic adenomastosis, hepatocellular carcinoma, hepatobilliary cancer, insulinoma, intraepithelial neoplasia, squamous cell intraepithelial neoplasia, invasive squamous-cell carcinoma, large cell carcinoma, leiomyosarcoma, melanoma, malignant melonoma, malignant mesothelial tumor, medulobastoma, meduloepithelioma, mucoepidermoid carcinoma, neuroblastoma, neuroepithelial adenocarcinoma, nodular melanoma, osteosarcoma, papillary serous adenocarcinoma, pituitary tumors, plasmacytoma, pseudosarcoma, pulmonary blastoma, renal cell carcinoma, retinoblastoma, rhabdomyosarcoma, sarcoma, serous carcinoma, microcytic carcinoma, soft tissue carcinoma, somatostatin secreting tumor, squamous carcinoma, squamous cell carcinoma, undifferentiated carcinoma, uveal melanoma, verrucous carcinoma, vipoma, Wilm tumor, intracerebral cancer, head and neck cancer, rectal cancer, astrocytoma, glioblastoma, microcytic cancer and non-microcytic cancer, metastatic melanoma, androgen-independent metastatic prostate cancer, androgen-dependent metastatic prostate cancer and breast cancer.

In an even more preferred embodiment of the invention, the polycationic peptide of the fusion protein or the nanoparticle of the invention is a CXCR4 ligand, and the cancer targeted to be treated with the fusion protein or the nanoparticle of the invention is characterized by comprising cells which express the CXCR4 receptor. In a more preferred embodiment, the cells cancer cells that express or overexpress CXCR4 are metastatic stem cells. The term "metastatic stem cells", as used herein, refers to cells that are responsible for metastasis initiation and metastasis maintenance In a yet more preferred embodiment of the invention, the CXCR4 ligand of the fusion protein or the nanoparticle of the invention is selected from the group comprising the T22 peptide, the V1 peptide, the CXCL12 peptide, the vCCL2 peptide or a functionally equivalent variant thereof.

In another more preferred embodiment of the invention, the cancer to be treated with the fusion protein or the nanoparticle of the invention is selected from the group consisting of pancreatic and colorectal cancer.

In another more preferred embodiment of the invention, the cancer to be treated with the fusion protein or the nanoparticle of the invention is a leukemia.

The term "leukemia", as used herein, refers broadly to progressive, malignant diseases of the blood-forming organs and is generally characterized by a distorted proliferation and development of leukocytes and their precursors in the blood and bone marrow. Exemplary leukemias that may be treated with a compound or method provided herein include, for example, acute non-lymphocytic leukemia, chronic lymphocytic leukemia, acute granulocytic leukemia, chronic granulocytic leukemia, acute promyelocyte leukemia, adult T-cell leukemia, aleukemic leukemia, a leukocythemic leukemia, basophylic leukemia, blast cell leukemia, bovine leukemia, chronic myelocytic leukemia, leukemia cutis, embryonal leukemia, eosinophilic leukemia, Gross' leukemia, hairy-cell leukemia, hemoblastic leukemia, hemocytoblastic leukemia, histiocytic leukemia, stem cell leukemia, acute monocytic leukemia, leukopenic leukemia, lymphatic leukemia, lymphoblastic leukemia, lymphocytic leukemia, lymphogenous leukemia, lymphoid leukemia, lymphosarcoma cell leukemia, mast cell leukemia, megakaryocyte leukemia, micromyeloblastic leukemia, monocytic leukemia, myeloblastic leukemia, myelocytic leukemia, myeloid granulocytic leukemia, myelomonocytic leukemia, Naegeli leukemia, plasma cell leukemia, multiple myeloma, plasmacytic leukemia, promyelocytic leukemia, Rieder cell leukemia, Schilling's leukemia, stem cell leukemia, subleukemic leukemia, or undifferentiated cell leukemia.

In an even more preferred embodiment of the invention, the polycationic peptide of the fusion protein or the nanoparticle of the invention is a CXCR4 ligand, and the leukemia to be treated with the fusion protein or the nanoparticle of the invention is characterized by comprising cells which express the CXCR4 receptor. In a more preferred embodiment, the leukemia to be treated is CXCR4+ AML.

In another preferred embodiment of the invention, the fusion protein and the nanoparticle of the invention are used for the treatment of cancerous tumor, wherein the cancerous tumor is a primary tumor or a metastasis.

Additional Aspects of the Invention

1. A fusion protein comprising
   (i) a polycationic peptide,
   (ii) an intervening polypeptide region which is stefin A or a variant thereof and
   (iii) a positively charged amino acid-rich region,
   wherein the intervening polypeptide region is conjugated to at least one auristatin molecule.

2. The fusion protein according to aspect 1 wherein the polycationic peptide is selected from the group consisting of
   (i) a sequence which is capable of specifically interacting with a receptor on a cell surface and promoting internalization of the fusion protein on said cell,
   (ii) an arginine-rich sequence,
   (iii) the GWH1 peptide,
   (iv) a CD44 ligand,
   (v) a peptide capable of crossing the blood brain barrier,
   (vi) a cell penetrating peptide and
   (vii) a nucleolin-binding peptide.

3. The fusion protein according to aspect 2 wherein the polycationic peptide comprises a sequence which is capable of specifically interacting with a receptor on a cell surface and promoting internalization of the fusion protein on said cell, said sequence being a CXCR4 ligand.

4. The fusion protein according to aspect 3 wherein the CXCR4 ligand is a peptide selected from the group consisting of a peptide comprising the sequence RRWCYRKCYKGYCYRKCR (SEQ ID NO:5), the V1 peptide (SEQ ID NO:6), the CXCL12 (SEQ ID NO:7) peptide, the vCCL2 (SEQ ID NO:8) or a functionally equivalent variant thereof.

5. The fusion protein according to aspect 2 wherein the polycationic peptide is an arginine-rich sequence comprising a sequence selected from the group consisting of RRRRRRRRR (SEQ ID NO:1), RRRGRGRRR (SEQ ID NO:2), RARGRGRRR (SEQ ID NO:3), and RARGRGGGA (SEQ ID NO:4).

6. The fusion protein according to aspect 2 wherein the polycationic peptide is the CD44 ligand A5G27 (SEQ ID NO:15) or FNI/II/V (SEQ ID NO:16).

7. The fusion protein according to aspect 2 wherein the polycationic peptide is the peptide capable of crossing the blood brain barrier selected from the group consisting of Seq-1-7 (SEQ ID NO:17), Seq-1-8 (SEQ ID NO:18), Angiopep-2-7 (SEQ ID NO:19).

8. The fusion protein according to any of aspects 1 to 7 wherein the positively charged amino acid-rich region is a polyhistidine region.

9. The fusion protein according to aspect 8 wherein the polyhistidine region comprises between 2 and 10 contiguous histidine residues.

10. The fusion protein according to aspect 8 wherein the polyhistidine region is selected from the group consisting of the HAAHAH sequence, the HTHTHTHTH sequence and the HEHEHEHEH sequence.

11. The fusion protein according to any of aspects 1 to 10 wherein the Stefin A is human Stefin A and wherein amino acids 71 to 73 are replaced with a heterologous peptide insertion.

12. The fusion protein according to aspect 11 wherein the heterologous peptide insertion consists of the amino acids NGP.

13. The fusion proteome according to aspect 12 wherein the Stefin A comprises a V48D mutation and/or a G4W mutation.

14. The fusion proteome according to any of aspects 1 to 13 wherein the auristatin is monomethylauristatin e.

15. The fusion protein according to any of aspects 1 to 14 wherein the polycationic peptide is located at the N-terminus and the positively charged amino acid-rich region is located at the C-terminus of the fusion protein or wherein the positively charged amino acid-rich region is located at the N-terminus and the polycationic peptide is located at the C-terminus of the fusion protein.

16. The fusion protein according to any of aspects 1 to 15 wherein the polycationic region is connected to the intervening polypeptide via a first peptide linker and/or wherein the intervening polypeptide is connected to the positively charged amino acid-rich region via a second peptide linker.

17. The fusion protein according to aspect 16 wherein the first peptide linker comprises the GGSSRSS sequence (SEQ ID NO:35) or the GGGNS sequence (SEQ ID NO:36).

18. The fusion protein according to any of aspects 1 to 14 wherein the intervening polypeptide contains at least 3 copies of auristatin E.

19. A method for preparing a fusion protein according to any of aspects 1 to 18 comprising
 (i) providing a fusion protein comprising
  i. a polycationic peptide,
  ii. an intervening polypeptide region which is stefin A or a variant thereof and
  iii. a positively charged amino acid-rich region,
  wherein the polycationic peptide and the positively charged amino acid-rich region are located at the ends of the protein and
 (ii) contacting said fusion protein with an activated form of a auristatin E which is capable of reacting with at least one group in the intervening region of the fusion protein and wherein the contacting is carried out under conditions adequate for the formation of a bond between the reactive group in the auristatin E and the group in the intervening polypeptide region.

20. The method according to aspect 19 wherein the activated form of Auristatin E contains a group which reacts with at least one of the side chains in the intervening polypeptide region.

21. The method according to aspect 20 wherein the group which reacts with at least one of the side chains in the intervening polypeptide region is a thiol group.

22. A method for preparing nanoparticle comprising multiple copies of the fusion protein according to any of aspects 1 to 15 selected from
 (i) A method which comprises placing a preparation of said fusion protein under conditions adequate for the assembly of a plurality of copies of the fusion proteins into a nanoparticle or
 (ii) A method which comprises
  i. placing a preparation of a fusion protein comprising
   1. a polycationic peptide,
   2. an intervening polypeptide region which is Stefin A or a variant thereof and
   3. a positively charged amino acid-rich region, wherein the polycationic peptide and the positively charged amino acid-rich region are located at the ends of the protein and wherein the fusion protein is provided in an activated form, wherein said activated form of the fusion protein contains a reactive group in the intervening region under conditions adequate for the formation of a nanoparticle containing a plurality of copies of the fusion protein and
  ii. contacting said nanoparticle with an activated form of Auristatin E, which contains a group which is capable of reacting with the reactive group in the fusion protein, wherein said contacting is carried out under conditions adequate for the formation of a bond between the reactive group in the fusion protein and the group in the Auristatin E.

23. The method according to aspect 22 wherein the low salt buffer is selected from the group consisting of a carbonate buffer, a Tris buffer and a phosphate buffer.

24. The method according to aspect 23 wherein the carbonate buffer comprises sodium bicarbonate at a concentration of between 100 and 300 mM, the Tris buffer comprises Tris at a concentration of between 10 and 30 mM and/or wherein the phosphate buffer comprises $Na_2HPO_4$ and $NaH_2PO_4$ at a total concentration of between 5 mM and 20 mM.

25. The method according to aspect 22 to 24 wherein the low salt buffer further comprises dextrose and/or glycerol.

26. The method according to any of aspects 22 to 25 wherein the pH of the buffer is between 6.5 and 8.5.

27. The method according to any of aspects 22 to 26 wherein the buffer is selected from the group consisting of
 (i) 166 mM $NaHCO_3$, pH 7.4,
 (ii) 20 mM Tris 500 mM 5% dextrose pH 7.4 and
 (iii) 140 mM NaCl, 7.5 mM Na2HPO4, 2.5 mM NaH2PO4 b10% glycerol pH 7.4.

28. A nanoparticle comprising multiple copies of the fusion protein according to any of aspects 1 to 18 or which has been obtained by a method according to any of aspects 22 to 27

29. The nanoparticle according to aspect 28 having a diameter of between 10 and 100 nm.

30. A fusion protein according to any of aspects 1 to 18 or a nanoparticle according to aspects 28 or 29 for use in medicine.

31. A fusion protein according to any of aspects 1 to 18 or a nanoparticle according to aspects 28 or 29 wherein the polycationic peptide is a sequence which is capable of specifically interacting with a receptor on a cell surface and promoting internalization of the fusion protein on said cell, wherein said cell is a tumor cell present in a cancer for use in the treatment of cancer.

32. The fusion protein or nanoparticle for use according to aspect 31 wherein the polycationic peptide is a CXCR4 ligand and wherein the cancer is characterized in that it comprises cancer cells that express or overexpress CXCR4.

33. The fusion protein or nanoparticle for use according to aspect 32 wherein the CXCR4 ligand is selected from the group consisting of the peptide comprises the sequence RRWCYRKCYKGYCYRKCR (SEQ ID NO:1), the V1 peptide (SEQ ID NO:2), the CXCL12 peptide (SEQ ID NO:3), the vCCL2 peptide (SEQ ID NO:4) or a functionally equivalent variant thereof.

34. The fusion protein or nanoparticle for use according to aspect 32 or 33 wherein the cancer cells that express or overexpress CXCR4 are metastatic stem cells.

35. The fusion protein or nanoparticle for use according to aspects 31 to 34 wherein the cancer is pancreatic or colorectal cancer.

36. The fusion protein or nanoparticle for use according to any of aspects 31 to 35 wherein the tumor cancer is a primary tumor or a metastasis.

EXAMPLES

Example 1

Synthesis of Therapeutic Nanoconjugates
Synthesis of the T22-STM-H6-Aur Therapeutic Nanoconjugate.

T22-STM-H6 protein nanoparticles (in 166 mM NaCO3H pH=8 buffer) are reacted with maleimide functionalized Monomethyl Auristatine E (MMAE) (resuspended in 50% PBS/50% Acetonitrile) in a one-pot reaction at 1:50 protein: MMAE ratio for 4 h at room temperature. Generated nanoconjugates are subsequently charged into a HiTrap Chelating HP column (GE Healthcare), previously charged with Ni$^{2+}$ (NiCl$_2$), for IMAC affinity chromatography and washed within the column for 30 min with wash buffer (20 mM Tris, 500 mM NaCl, 10 mM imidazole pH=8) at constant flow in order to remove no reacted MMAE molecules before one-step isocratic elution with elution buffer (20 mM Tris, 500 mM NaCl, 500 mM Imidazole pH=8). Eluted nanoconjugates are then dyalized agains 166 mM NaCO3H pH=8 buffer for high concentration imidazole containing elution buffer removal using 12-14MWCO membranes, O/N at 4° C. Final nanoconjugates are finally filtered by 0.22 μm pore filters within sterile laminar flow hood for product sterilization. Physico-chemical characterization of resulting T22-STM-H6-Auristatine nanoconjugates is done by Dynamic Light Scattering and MALDI-TOF mass spectrometry.

Synthesis of the T22-GFP-H6-Aur Therapeutic Nanoconjugate.

T22-GFP-H6 protein nanoparticles (in 166 mM NaCO3H pH=8 buffer) are reacted with maleimide functionalized Monomethyl Auristatine E (MMAE) (resuspended in 50% PBS/50% Acetonitrile) in a one-pot reaction at 1:50 protein:MMAE ratio for 4 h at room temperature. Generated nanoconjugates are subsequently charged into a HiTrap Chelating HP column (GE Healthcare), previously charged with Ni$^{2+}$ (NiCl$_2$), for IMAC affinity chromatography and washed within the column for 30 min with wash buffer (20 mM Tris, 500 mM NaCl, 10 mM imidazole pH=8) at constant flow in order to remove no reacted MMAE molecules before one-step isocratic elution with elution buffer (20 mM Tris, 500 mM NaCl, 500 mM Imidazole pH=8). Eluted nanoconjugates are then dyalized agains 166 mM NaCO3H pH=8 buffer for high concentration imidazole containing elution buffer removal using 12-14MWCO membranes, O/N at 4° C. Final nanoconjugates are finally filtered by 0.22 μm pore filters within sterile laminar flow hood for product sterilization. Physico-chemical characterization of resulting T22-GFP-H6-Auristatine nanoconjugates is done by Dynamic Light Scattering and MALDI-TOF mass spectrometry.

Example 2

Characterization of the T22-STM-H6-Aur Nanoconjugate and Determination of Drug/Nanoparticle Ratio The nanoparticles of T22-GFP-H6 are formed by an average of 15 monomers, and each monomer of T22-GFP-H6-FdU joins about 4 molecules of oligo-FdU. This is equivalent to about 60 molecules of oligo-FdU per nanoparticle. As for the T22-GFP-H6-Auristatin, the data show that it binds up to 30 Auristatins per protein, which is equivalent to about 450 Auristatins per nanoparticle.

The nanoparticles of T22-STM-H6 are formed by an average of between 15-20 monomenos. Mass spectrometry suggests that no less than 3 Auristatine molecules are joined to each protein monomer and at least up to more than 15 Auristatine molecules per monomers.

Example 3

Evaluation of the Antitumoral Effect of T22-STM-H6-Auristatin, Compared to T22-GFP-H6-Auristatin, in a Disseminated CXCR4+ AML Mouse Mode Methods NSG (NOD-scid IL2Rgamma$^{null}$) female mice (5 weeks old) were intravenously (IV) injected with luciferase-transfected THP1 cells (THP-1-Luci; 1×10$^6$ cells/200 μL). Mice were divided randomly into three different experimental groups. One group (VEH; n=3) was IV injected with the vehicle of the nanoconjugates (Buffer NaCO$_3$H+NaCl pH=8), the experimental group (T22-STM-AUR; n=2) with 100 μg of T22-STM-H6-Auristatin and a positive control group (T22-GFP-AUR; n=1) with 100 ug of T22-GFP-H6-Auristatin. All compounds were administered daily for a total of 9 doses. The evolution of AML dissemination in mice was monitored using the IVIS Spectrum equipment three times per week until the day of the euthanasia. Animal weight was measured the same day as that of BLI analysis. All mice were euthanized the day that the first animal presented relevant signs of disease such as lack of mobility or 10% weight loss. Infiltrated tissues (bone marrow, liver and spleen) were excised to analyze the BLI levels ex vivo. Bioluminescence measurements are expressed as Total flux of BLI (photons/second; Radiance photons)±SE in both in vivo and ex vivo studies.

Results

Figure 2A:
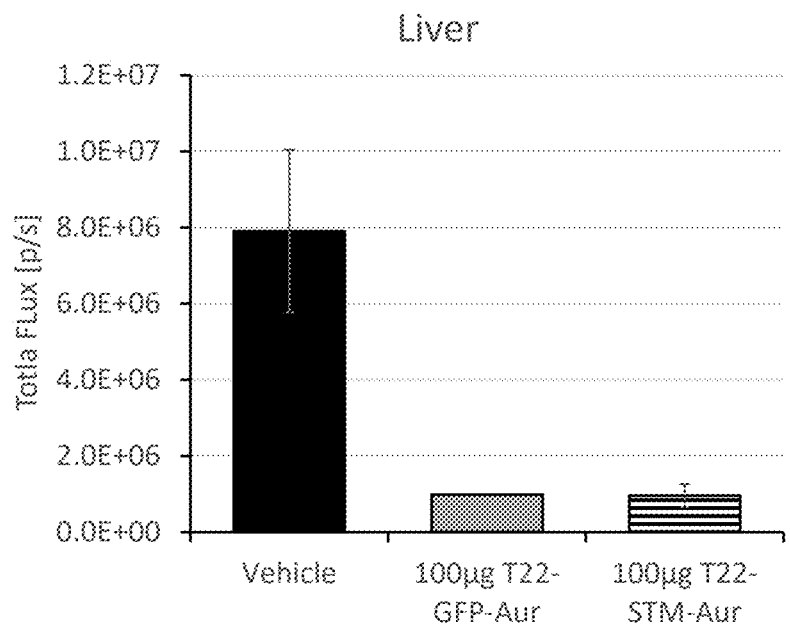
FIG. 2: Mean level of ex vivo bioluminescence in the organs infiltrated by leukemic cells (liver (A), spleen (B) and bone marrow (C)).
Figure 2B:
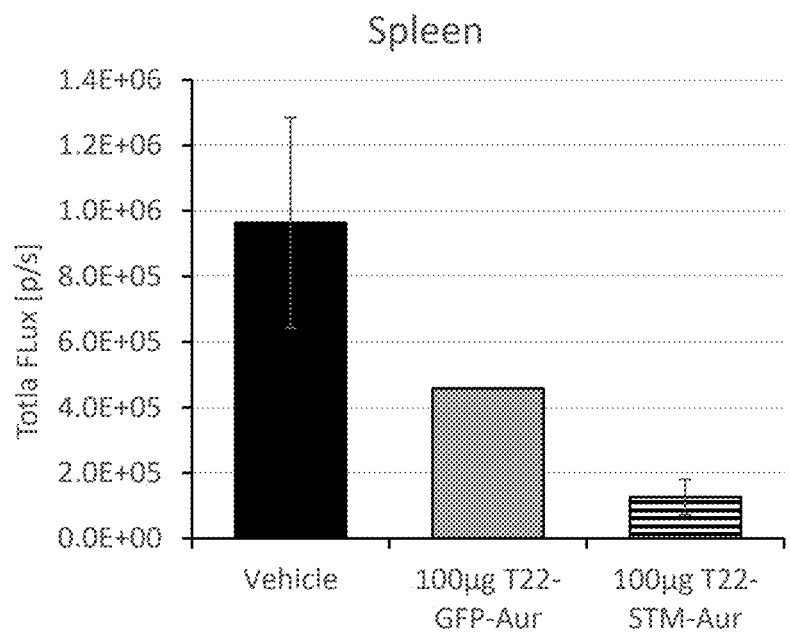
Figure 2C:
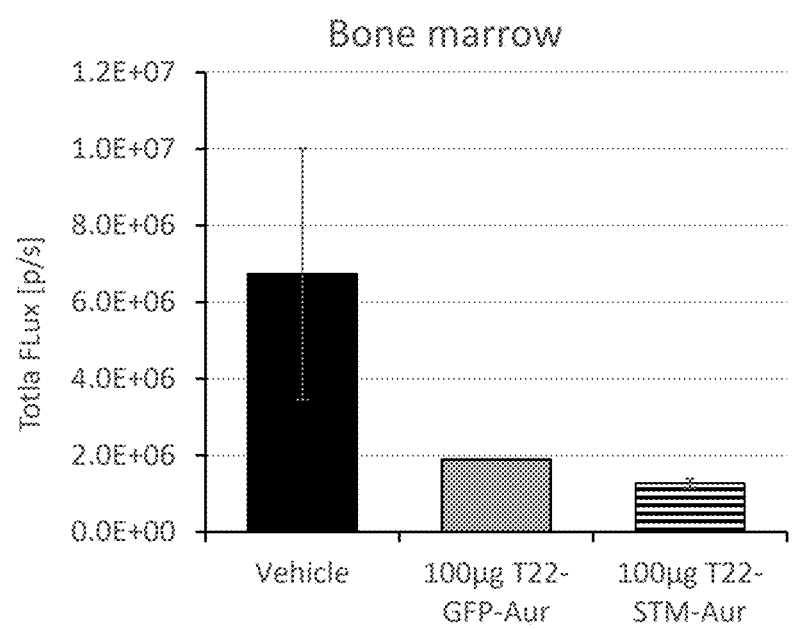
Figure 3:
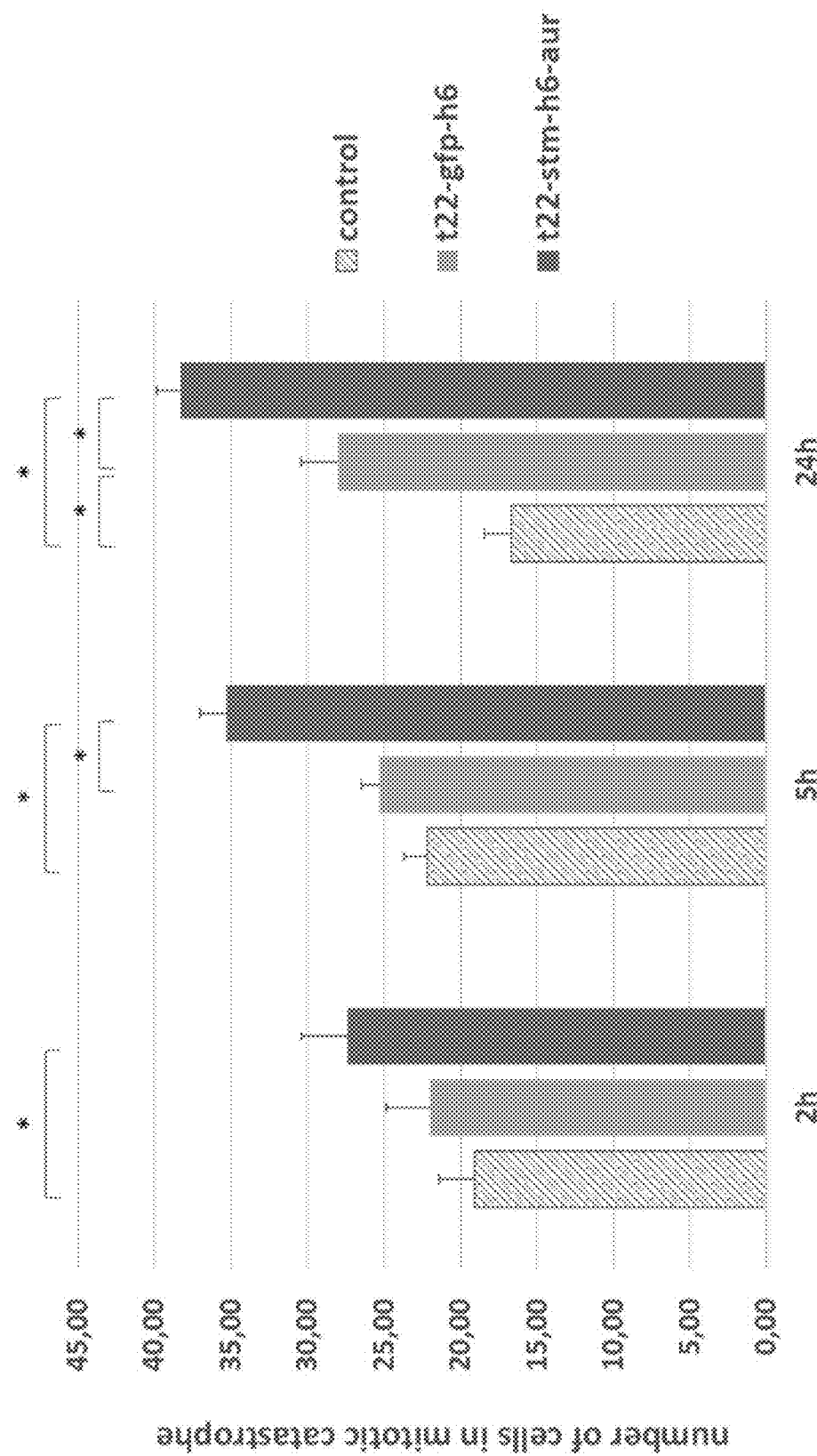
FIG. 3: Significant increase of the number of cells in mitotic catastrophe, by counting ten Hematoxilin & Eosin satined fields of the M5 subcutaneous tumors, 2 h, 5 h or 24 hours after the intravenous administration of 200 µg of T22-STM-H6-Aur (Auristatin conjugated to the protein nanoparticle T22-STM-H6) as compared to the number of mitotic catastrophe figures at the same time points after the administration of 200 µg of the unconjugated protein nanocarrier T22-GFP-H6 or control Buffer. The M5 subcutaneous CRC model was generated in Swiss nude mice from a colorectal cancer patient sample. * p<0.05.

The antitumor activity of the nanoconjugate T22-STM-H6-Auristatin was assessed in vivo in a disseminated AML mouse model after intravenous injection of the human cell line THP-1 that expresses high levels of CXCR4 receptor. Two days after injecting the cells, daily administration of nanoconjugates or vehicle was started. The dissemination of leukemic cells was assessed non-invasively using the equipment IVIS Spectrum that allows monitoring the bioluminescence emitted by THP-1 AML cells. From days 6-8 and until the end of the experiment, nanoconjugate-treated (T22-STM-H6-Auristatin and T22-GFP-H6-Auristatin) mice showed an intensity of luminescence lower than the vehicle. These observed differences between groups were progressively increased from the day 8 until 13, even during the three days lapse after the last dose of nanoconjugates which were administered on day 10 (FIGS. 1 and 2). In addition, measurement of organs infiltrated by leukemic cells (bone marrow, liver and spleen) in ex vivo assays also showed a reduction of leukemia dissemination (FIG. 3). Body weight was not altered during the experiment and no signs of toxicity were observed nor macroscopically during the necropsias neither microscopically after histopathological analyses of all organs by H&E staining.

Example 4

Increased Mitotic Catastrophe after the Administration of the T22-SM-H6-Aur And T22-GFP-H6-Aur Nanoconjugates in a Subcutaneous Colorectal Cancer Model.

Figure 4:
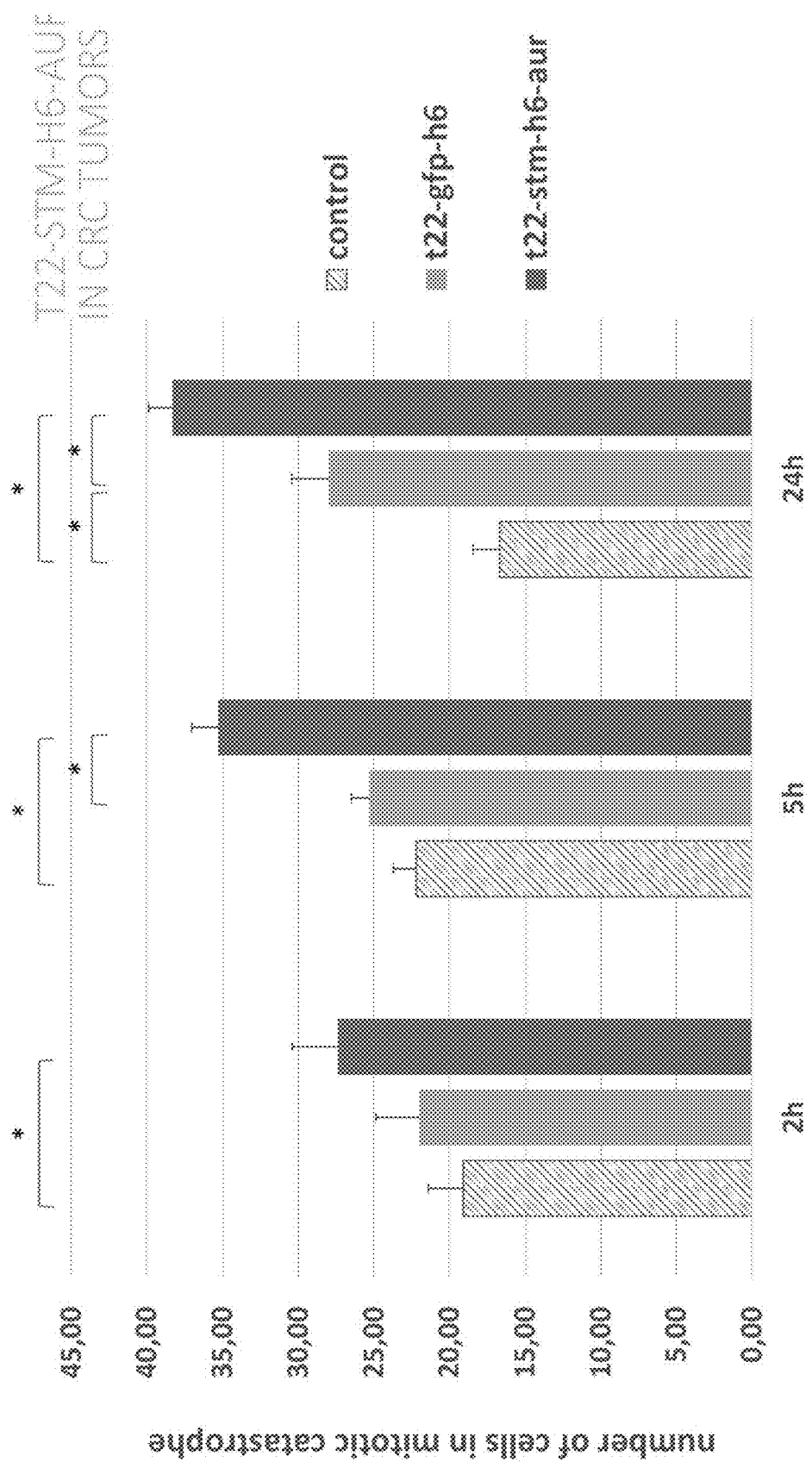
FIG. 4: Increased mitotic catastrophe after the administration of the T22-STM-H6-Aur nanoconjugate in a subcutaneous colorectal cancer model. Significant increase of the number of cells in mitotic catastrophe, by counting ten Hematoxilin & Eosin stained fields of the M5 subcutaneous tumors, 2 h, 5 h or 24 hours after the intravenous administration of 200 µg of T22-STM-H6-Aur (Auristatin conjugated to the protein nanoparticle T22-STM-H6) as compared to the number of mitotic catastrophe figures at the same time points after the administration of 200 µg of the unconjugated protein nanocarrier T22-GFP-H6 or control Buffer. The M5 subcutaneous CRC model was generated in Swiss nude mice from a colorectal cancer patient sample. * p<0.05.
Figure 5:
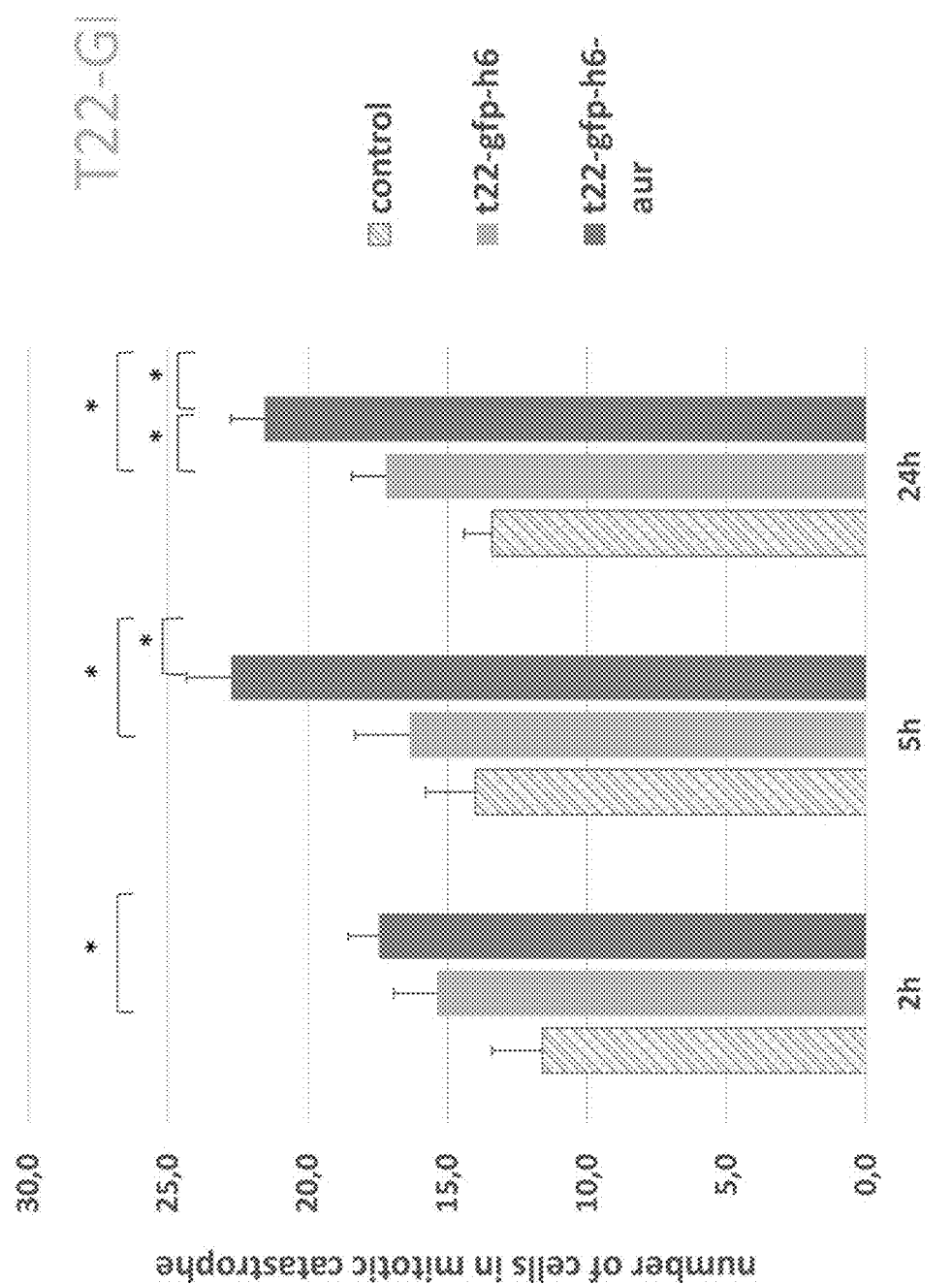
FIG. 5: Increased in mitotic catastrophe after the administracion of T22-GFP-H6-Aur nanoconjugate in a subcutaneous colorectal cancer model. Significant increase of the number of cells in mitotic catastrophe, by counting five H&E stained fields of the M5 subcutaneous tumors 2 h, 5 h or 24 hours after the i.v. administration of 326 µg of T22-GFP-H6-Aur (Auristatin conjugated to the protein nanoparticle T22-GFP-H6) as compared to the number of mitotic catastrophe figures at the same time points after the administration of 326 µg of the unconjugated protein nanocarrier T22-GFP-H6 or control Buffer. The M5 subcutaneous CRC model was generated in Swiss nude mice form a colorectal cancer patient sample. * p<0.05.

M5 subcutaneous CRC models were generated in Swiss nude mice form colorectal cancer patient samples. 200 μg of the T22-STM-H6-Aur conjugate (Auristatin conjugated to the protein nanoparticle T22-STM-H6) or 326 μg of the T22-GFP-H6-Aur conjugate (Auristatin conjugated to the protein nanoparticle T22-GFP-H6) was administered i.v. to animals and the number of cells in mitotic catastrophe 2 h, 5 h or 24 hours after the administration of the conjugates was determined by counting five H&E stained fields and compared with the number of cells in mitotic catastrophe after the administration of the same amount of the corresponding unconjugated nanocarriers T22-STM-H6, T22-GFP-H6 or to control buffer. The results are shown in FIG. 4 for the mice treated with the T22-STM-H6-Aur nanoconjugate and in FIG. 5 for the mice treated with the T22-GFP-H6-Aur nanoconjugates.

The results show that there was a significant increase of the number of cells in mitotic catastrophe in tumors from mice that were treated with the conjugated nanocarriers as compared to those treated with the unconjugated nanocarriers or with the control buffer.

Example 5

Biochemical characterization of histidine-derived protein constructs upon purification Volume size distribution of histidine-rich proteins dialyzed against standard sodium carbonate buffer or the same buffer with salt The results are shown in Table 1.

Main properties of T22-GFP histidine-rich protein nanoparticles carrying modified histidine tag sequences. PDI: polydispersion index.

| Protein[1] | Sequence[2,3,4][b,c,d] | Molecular weight (KDa) | Specific fluorescence (units/mg) | Hydrodynamic diameter/PDI (nm) | Z-potential (mV) | Imidazole elution concentration (mM)[e5] |
|---|---|---|---|---|---|---|
| T22-GFP-H6 | T22-linker-GFP-HHHHHH | 30.692 | 9360.0 ± 198 | 11.7/0.361 ± 0.012 | −17.2000 ± 1.2 | 125 |
| T22-GFP-H3A | T22-linker-GFP-HAAHAH | 30.493 | 12003.9 ± 473 | 18.17/0.267 ± 0.006 | −15.0667 ± 0.59 | 68.5 |
| T22-GFP-H5T | T22-linker-GFP-HTHTHTHTH | 30.958 | 15121.8 ± 70 | 10.10/0.403 ± 0.010 | −12.9000 ± 0.32 | 100 |
| T22-GFP-H5E | T22-linker-GFP-HEHEHEHEH | 31.071 | 10920.2 ± 79 | 10.9/0.354 ± 0.043 | −16.9333 ± 2.1 | 78 |

[1]The values 6, 3, and 5 refer to the total number of histidine residues in the C-terminal tag and A, T and E refer to alanine, threonine and glutamic amino acids respectively.
[2]The T22 sequence is MRRWCYRKCYKGYCYRKCR
[3]Bold segments correspond to the introduced amino acids in the study.
[4]The linker sequence is GGSSRSS.
[5]The percentage of elution buffer needed to induce protein elution from immobilised Metal Ion Affinity Chromatography.

The invention claimed is:

1. A fusion protein comprising
   (i) a polycationic peptide, wherein the polycationic peptide comprises a sequence selected from the group consisting of SEQ ID NO: 5, SEQ ID NO: 6, SEQ ID NO: 7, SEQ ID NO: 8, and a functionally equivalent variant thereof having at least 70% sequence identity with SEQ ID NO: 5,
   (ii) an intervening polypeptide region which is Stefin A, wherein the Stefin A is human Stefin A and wherein amino acids 71 to 73 are replaced with a heterologous peptide insertion, wherein said peptide insertion consists of the amino acids NGP and wherein the Stefin A comprises a V48D mutation and/or a G4W mutation, and
   (iii) a positively charged amino acid-rich region,
   wherein the intervening polypeptide region is conjugated to at least one auristatin molecule.

2. The fusion protein according to claim 1, wherein the positively charged amino acid-rich region is a polyhistidine region, wherein the polyhistidine region comprises between 2 and 10 contiguous histidine residues.

3. The fusion protein according to claim 1, wherein the auristatin is monomethylauristatin E.

4. The fusion protein according to claim 1, wherein the polycationic peptide is located at the N-terminus and the positively charged amino acid-rich region is located at the C-terminus of the fusion protein or wherein the positively charged amino acid-rich region is located at the N-terminus and the polycationic peptide is located at the C-terminus of the fusion protein.

5. The fusion protein according to claim 1, wherein the polycationic region is connected to the intervening polypeptide region via a first peptide linker and/or wherein the intervening polypeptide region is connected to the positively charged amino acid-rich region via a second peptide linker.

6. The fusion protein according to claim 5, wherein the first peptide linker comprises the GGSSRSS sequence (SEQ ID NO:35) or the GGGNS sequence (SEQ ID NO:36).

7. The fusion protein according to claim 1, wherein the intervening polypeptide region contains at least 3 copies of auristatin E.

8. A nanoparticle comprising multiple copies of the fusion protein according to claim 1, the nanoparticle preferably having a diameter of between 10 and 100 nm.

9. A method for the treatment of cancer in a subject in need thereof, the method comprising the administration to said subject of a therapeutically effective amount of the fusion protein according to claim 1.

10. The method according to claim 9, wherein the cancer is characterized in that it comprises cancer cells that express or overexpress CXCR4.

11. The method according to claim 10, wherein the cancer cells that express or overexpress CXCR4 are metastatic stem cells.

12. The method according to claim 9, wherein the cancer is pancreatic or colorectal cancer.

13. The method according to claim 9, wherein the tumor cancer is a primary tumor or a metastasis.

* * * * *